(12) United States Patent
Ohmori et al.

(10) Patent No.: US 9,208,908 B2
(45) Date of Patent: Dec. 8, 2015

(54) METHOD OF REPAIRING SHROUD SUPPORT AND REPAIR APPARATUS THEREOF

(71) Applicant: Hitachi-GE Nuclear Energy, Ltd., Hitachi-shi, Ibaraki (JP)

(72) Inventors: Shinya Ohmori, Mito (JP); Koichi Kurosawa, Hitachi (JP); Masaaki Tanaka, Hitachi (JP); Takanori Satoh, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 268 days.

(21) Appl. No.: 13/753,629

(22) Filed: Jan. 30, 2013

(65) Prior Publication Data
US 2013/0195238 A1    Aug. 1, 2013

(30) Foreign Application Priority Data
Jan. 31, 2012    (JP) .................................. 2012-017612

(51) Int. Cl.
| | |
|---|---|
| *G21C 19/00* | (2006.01) |
| *G21C 13/024* | (2006.01) |
| *G21C 19/02* | (2006.01) |
| *G21C 19/20* | (2006.01) |

(52) U.S. Cl.
CPC .............. *G21C 19/00* (2013.01); *G21C 13/024* (2013.01); *G21C 19/02* (2013.01); *G21C 19/207* (2013.01); *G21Y 2004/50* (2013.01)

(58) Field of Classification Search
CPC .............. G21C 13/024; G21C 19/207; G21Y 2002/103; G21Y 2002/302; G21Y 2004/50; G21Y 2004/501

USPC .................................................. 376/461, 305
See application file for complete search history.

(56) References Cited

U.S. PATENT DOCUMENTS

| | | | |
|---|---|---|---|
| 5,864,595 A * | 1/1999 | Burrows et al. ............... | 376/260 |
| 2006/0222138 A1 | 10/2006 | Shimamura et al. | |
| 2008/0317192 A1 * | 12/2008 | Rowell et al. ................. | 376/249 |
| 2009/0135985 A1 * | 5/2009 | Ono et al. ..................... | 376/260 |
| 2010/0242247 A1 * | 9/2010 | Jones et al. ................ | 29/402.01 |

FOREIGN PATENT DOCUMENTS

| | | |
|---|---|---|
| JP | 2001-296386 A | 10/2001 |
| JP | 4262450 B2 | 5/2009 |
| JP | 4528711 B2 | 8/2010 |
| JP | 4585079 B2 | 11/2010 |
| JP | 4634742 B2 | 2/2011 |

* cited by examiner

*Primary Examiner* — Jack W Keith
*Assistant Examiner* — Sharon M Davis
(74) *Attorney, Agent, or Firm* — Crowell & Moring LLP

(57) ABSTRACT

A shroud support of a BWR includes a shroud support cylinder, shroud support legs welded to a bottom of a reactor pressure vessel (RPV) and a shroud support cylinder, and an annular shroud support plate disposed between the RPV and the shroud support cylinder and welded to the RPV and the shroud support cylinder. A support apparatus is set a CRD housings installed to the bottom of the RPV. A rail guide member horizontally set to the support apparatus reaches directly below the shroud support plate through an opening between the shroud support legs. A bent rail is set on the rail guide member. The bent rail setting a repair device is pushed out along the rail guide member toward the RPV through the opening portion by the rail push-out apparatus set on the support apparatus. The bent rail is spread at directly below the shroud support plate.

5 Claims, 36 Drawing Sheets

METHOD OF REPAIRING SHROUD SUPPORT AND REPAIR APPARATUS THEREOF

CLAIM OF PRIORITY

The present application claims priority from Japanese Patent application serial no. 2012-017612, filed on Jan. 31, 2012, the content of which is hereby incorporated by reference into this application.

BACKGROUND OF THE INVENTION

1. Technical Field

The present invention relates to a method of repairing a shroud support and a repair apparatus thereof and more particularly to a method of repairing a shroud support and a repair apparatus thereof which are preferably applicable to repair of a weld of the shroud support in a reactor pressure vessel during a in-service period of a nuclear power generation plant.

2. Background Art

A shroud support disposed in a reactor pressure vessel of a nuclear power generation plant includes a shroud support cylinder, a shroud support plate and a plurality of shroud support legs. The welds of the shroud support include many welds such as a weld (H9) between an inner surface of the reactor pressure vessel and a shroud support plate, a weld (H8) between a shroud support cylinder and the shroud support plate, a weld (H10) between the shroud support cylinder and a shroud support leg, a weld (H11) between the inner surface of the reactor pressure vessel and the shroud support leg, and a weld (H7) between the shroud support cylinder and a lower portion of a core shroud 6.

In the respective welds, cracks may be considered to generate and a plurality of cracks may be considered to generate at optional positions through the length of each weld line. In this case, when cracks are generated at a plurality of positions, every time, an apparatus having a structure dependent upon the position is prepared, thus a problem arises from the viewpoint of cost reduction.

Further, when cracks are generated at a plurality of positions, if the apparatus is moved and installed at each position and repair operation is executed, a problem arises similarly from the viewpoint of operation term reduction and operability improvement. At least, the welds (H8 and H9) of the shroud support have a weld line at 360° in the circumference and when cracks are generated in the entire perimeter, the consideration of a repair method capable of repairing continuously for the entire perimeter of each weld line is preferable from the viewpoint of the process, cost, and radiation exposure reduction.

As a maintenance method and apparatus of the shroud support disposed in the reactor pressure vessel of the nuclear power generation plant which are conventionally proposed, there are an operation apparatus and an operation method (see Japanese Patent No. 4585079) of repairing from a lower side of the shroud support plate by a pantograph mechanism from an inside of the core shroud and an intra-reactor repair apparatus having a structure which it is clamped in a plate thickness direction of the shroud support leg and receives reaction force and an intra-reactor repair method (see Japanese Patent No. 4634742).

On the other hand, as a method for changing an access route, an inspection repair maintenance apparatus (see Japanese Patent Laid-Open No. 2001-296386) of the shroud support for passing through the jet pump and repairing a lower portion of the shroud support, a repair system (see Japanese Patent No. 4262450) of a reactor narrow portion for approaching from a side of an annulus portion and repairing an upper portion of the shroud support plate, and an operation apparatus and an operation method (see Japanese Patent No. 4528711) using an underwater traveling vehicle are proposed.

CITATION LIST

Patent Literature

[Patent Literature 1] Japanese Patent No. 4585079
[Patent Literature 2] Japanese Patent No. 4634742
[Patent Literature 3] Japanese Patent Laid-Open No. 2001-296386
[Patent Literature 4] Japanese Patent No. 4262450
[Patent Literature 5] Japanese Patent No. 4528711

SUMMARY OF THE INVENTION

Technical Problem

However, in a maintenance correction method of, for example, the shroud support in the reactor pressure vessel described in the above Japanese Patent No. 4585079, the operation apparatus having the pantograph mechanism and operation equipment mounted to the pantograph mechanism is seated on one control rod drive mechanism (CRD) housing and the operation equipment is brought close to the weld of the shroud support from the one control rod drive mechanism housing being a starting point by the pantograph mechanism. In this case, an operable range is extremely limited, so that when cracks are generated at a plurality of positions, the apparatus must be moved and installed repeatedly according to the position of the objective cracks. Further, the shroud support leg is a hindrance to an area positioned on a rear side of the shroud support leg, so that repair by another means must be considered, and a plurality of apparatuses are required, so that it is a factor of an increase in cost.

Further, the intra-reactor repair apparatus described in Japanese Patent No. 4634742 similarly uses the shroud support leg at one position as a support starting point, so that the area capable of similarly executing the repair operation is limited. The same may be said with the inspection repair maintenance apparatus of the shroud support of Japanese Patent Laid-Open No. 2001-296386 which is another prior art.

Further, the repair system of the reactor narrow portion described in Japanese Patent No. 4262450 inserts a repair apparatus of the repair system on the shroud support plate by using a guide pipe disposed in the annulus portion in a state that the inside of the reactor pressure vessel is held an aerial environment and, and then travels itself to the repair place, so that it can approach the entire perimeter of the shroud support plate. However, if one apparatus is equipped with necessary functions such as welding, grinding, and PT, enlargement of the apparatus is caused in order to prepare each head, process a large amount of cable hoses, and ensure a thrust due to self travel for pulling around. As a consequence, miniaturization for application to a dimensional restriction of a narrow place is difficult. Further, when the welding, grinding, and PT functions are made independent, every time, the entire apparatus must be put in and out and the operation efficiency is lowered.

Further, the operation apparatus and operation method using the underwater traveling vehicle disclosed in Japanese Patent No. 4528711 improve in mobility, however, a problem arises that they cannot be applied to the repair operation in the aerial environment such as a repair welding and a PT inspection.

An object of the present invention is to provide a method of repairing a shroud support and a shroud support repair apparatus which can shorten the time required for the repair operation and also performing a highly-reliable repair operation.

Solution to Problem

A feature of a method of repairing a shroud support of the present invention for attaining the above object comprises steps of setting a plurality of rails along a weld of the shroud support in a reactor pressure vessel over either an entire perimeter on an inner circumference of the reactor pressure vessel or a repair range; attaching movably a repair device to the rail, and performing repair operation of the weld of the shroud support by the repair device.

Further, a first feature of a shroud support repair apparatus of the present invention for attaining the above object comprises a plurality of rails installed over an entire perimeter on circumference or a repair range of a weld of a shroud support in a reactor pressure vessel; a plurality of support arms for supporting the rails; a plurality of rail guide members for guiding the rail set thereon; a plurality of support apparatuses for fixing each of the rail guide members and each of the support arms; and a repair device movably set on the rail.

A second feature of a shroud support repair apparatus of the present invention for attaining the above object comprises a plurality of rails set on circumference of a lower surface of a weld of a shroud support in a reactor pressure vessel, a plurality of rail support apparatus for supporting the rails, a plurality of second support apparatus for supporting the rail support apparatus, and a repair device movably set on the rail.

A third feature of the present invention for attaining the above object is a shroud support repair apparatus installed in an annulus portion where a plurality of jet pumps are installed on an upper surface of a shroud support plate for partitioning vertically an annulus space formed between a reactor pressure vessel and each of a shroud support cylinder configuring a shroud support, and a core shroud disposed on the shroud support cylinder, the shroud support repair apparatus comprising a plurality of first rails set to each of a plurality of rise pipes communicated with each of the jet pumps; each of a plurality of second rails inserted between the first rails being adjacent to each other and set to an end portion of each of the first rails being adjacent to the second rail; a third rail being longer than the second rail, inserted between the other first rails being adjacent to each other and set to a end portion of each of the other first rails being adjacent to the third rail; a travel apparatus moving on the first rails, the second rails and the third rail; and a repair device disposed below the travel apparatus and attached to the travel apparatus.

Advantageous Effect of the Invention

According to the present invention, the time required for the repair operation for each weld of the shroud support can be shortened and a highly-reliable repair operation can be performed.

DETAILED DESCRIPTION OF THE PREFERRED EMBODIMENTS

Hereinafter, embodiments of a shroud support repair apparatus of the present invention will be explained based on drawn embodiments. Further, in each embodiment, same numerals are used for the same constituent parts.

[Embodiment 1]

Figure 1:
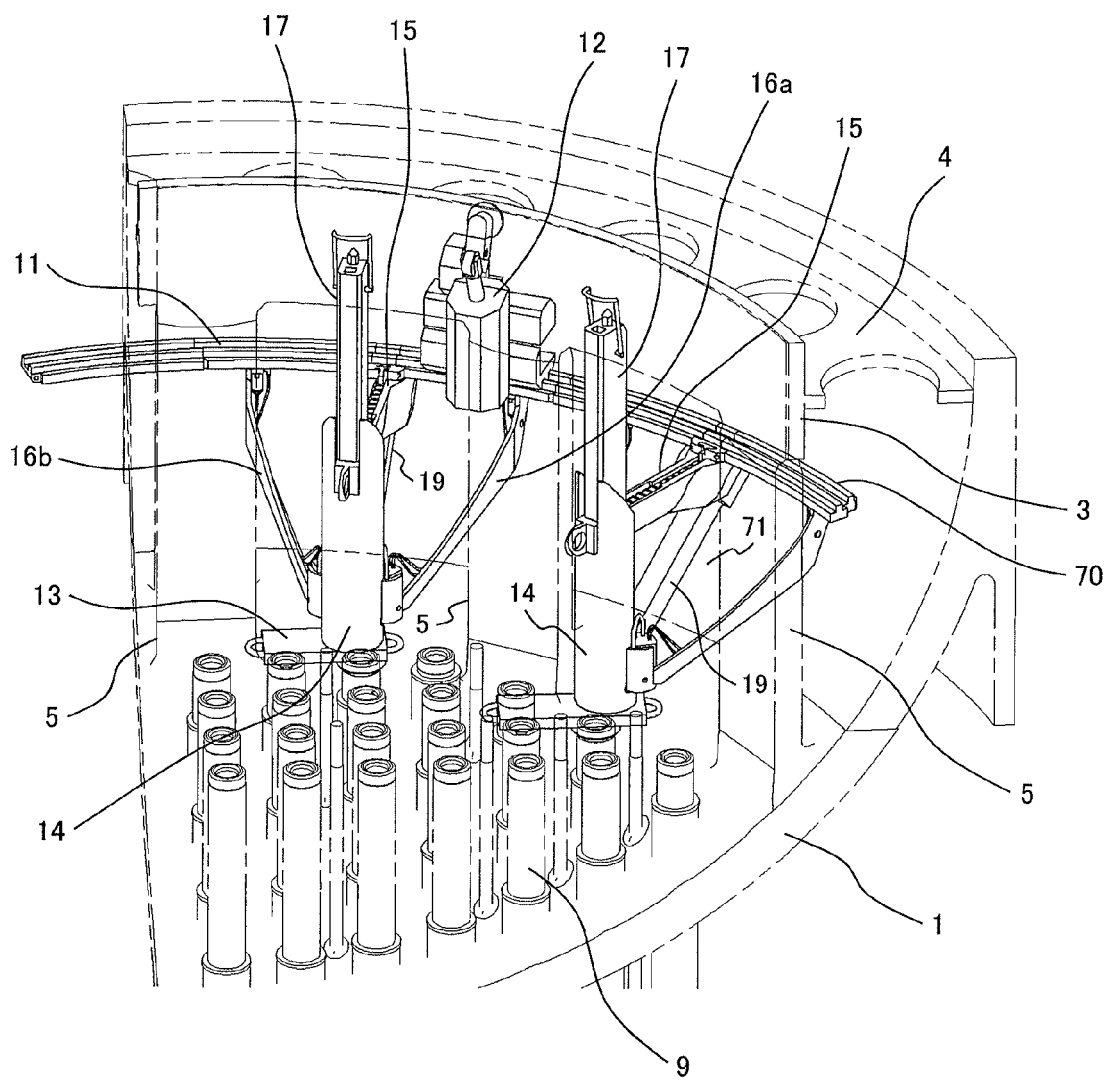
FIG. 1 is a partial perspective view showing an arm development repair apparatus according to embodiment 1, which is a preferred embodiment of a shroud support repair apparatus of the present invention, installed in a lower portion of a reactor pressure vessel.
Figure 2:
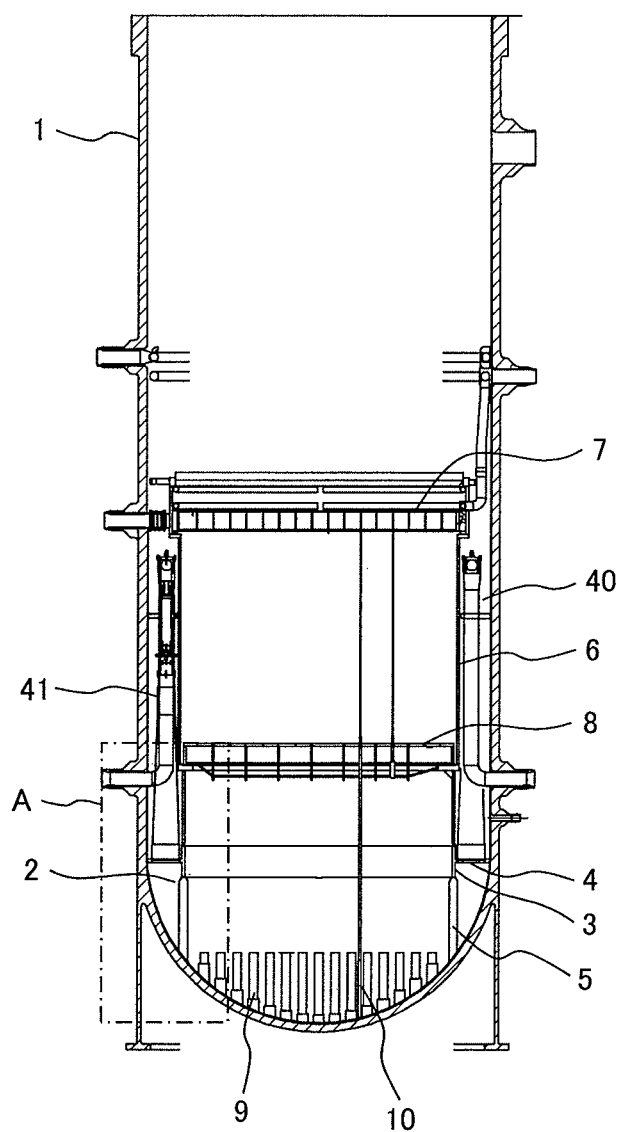
FIG. 2 is a longitudinal sectional view showing a reactor pressure vessel to which a shroud support repair apparatus of the present invention is applied.
Figure 3:
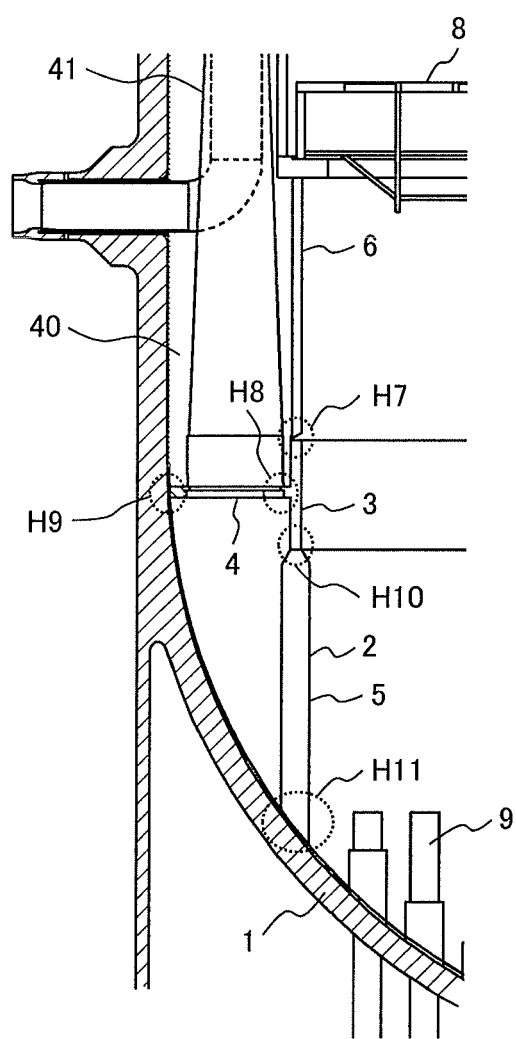
FIG. 3 is an explanatory drawing showing welds of a shroud support in an enlarged portion A shown in FIG. 2.

FIG. 1 is a partial perspective view showing an arm development repair apparatus according to embodiment 1, which is a preferred embodiment of a shroud support repair apparatus of the present invention, installed in a lower portion of a reactor pressure vessel. FIG. 2 is a longitudinal sectional view showing a reactor pressure vessel to which a shroud support repair apparatus of the present invention is applied. FIG. 3 is an explanatory drawing showing welds of a shroud support in an enlarged portion A shown in FIG. 2.

As shown in FIG. 2, in a boiling water nuclear power plant, a shroud support cylinder 3 configuring a shroud support 2 and a core shroud 6 supported by the shroud support cylinder 3 are installed in a reactor pressure vessel 1. An upper grid plate 7 and a core support plate 8 are disposed in the core shroud 6 and fixed to the core shroud 6. A plurality of control rod drive mechanism housing (hereinafter, referred to as a CRD housing) 9 and a plurality of incore monitor housings (hereinafter, referred to as an ICM housing) 10 stand together a reactor bottom of the reactor pressure vessel 1.

Further, an annulus space between the reactor pressure vessel 1 and the core shroud 6 is referred to as an annulus portion 40. An annular shroud support plate 4 is horizontally disposed in the annulus portion 40. An outer surface of the shroud support plate 4 is attached to an inner surface of the reactor pressure vessel 1 and an outer surface of the shroud support plate 4 is attached to an outer surface of the shroud support cylinder 3. The annulus portion 40 is vertically divided by the shroud support plate 4. A plurality of jet pumps 41 is arranged in the circumferential direction in the annulus portion 40 and attached to an upper surface of the shroud support plate 4. The shroud support cylinder 3 is supported from the bottom portion of the reactor pressure vessel 1 by a plurality of shroud support legs 5 arranged at established intervals in a circumferential direction of the shroud support cylinder 3.

As aforementioned, welds of the shroud support 2 include many welds such as a weld H9 between an inner surface of the reactor pressure vessel 1 and the shroud support plate 4, a weld H8 between the shroud support cylinder 3 and the shroud support plate 4, a weld H10 between the shroud support cylinder 3 and the shroud support leg 5, a weld H11 between the inner surface of the reactor pressure vessel 1 and the shroud support leg 5, and a weld H7 between the shroud support cylinder 3 and the lower portion of the core shroud 6 (see FIG. 3).

Hereinafter, as an example, an arm development repair apparatus 70 of the present embodiment for repairing the weld H9 between the inner surface of the reactor pressure vessel 1 and the shroud support plate 4 will be explained by referring to FIG. 1.

The arm development repair apparatus 70 of the present embodiment shown in FIG. 1 is an example of a rail assembly system and is roughly configured by a plurality of rails 11 set along a circumference of a lower surface of the weld of the shroud support plate 4, a plurality of support arms 16a and 16b for supporting the rails 11 from the lower surface at two places, a plurality of support apparatuses 14 to which the support arms 16a and 16b are fixed, a plurality of rail guide members 15 for guiding the rail 11 toward the inner surface of the reactor pressure vessel 1, a plurality of rail push-out apparatuses 17 for pushing out the rails 11 toward the inner surface of the reactor pressure vessel 1 and a repair device 12 set movably on the rail 11.

In the present embodiment, the support apparatus (first support apparatus) 14 is seated on the CRD housings 9 via a support base 13 and the support arms 16a and 16b are individually mounted on both sides of the support apparatus 14 and support the rail 11 at two places. The rail guide member 15 is connected to the support apparatus 14, fallen down in a horizontal direction at a fulcrum of the upper end portion of the support apparatus 14 and is an apparatus for playing a role of a guide when it is fallen down in the horizontal direction and the rail 11 is pushed out in a radius direction of the reactor pressure vessel by the rail push-out apparatus 17 fitted into the upper end portion of the support apparatus 14. Further, after the rail 11 was pushed out in the radius direction, both ends of the bent rail 11 are spread upward along the curvature of tops of the support arms 16a and 16b and are fixed by upper ends of the support arms 16a and 16b.

These rails 11 are disposed in the respective intervals of the shroud support legs 5 in the similar constitution. Each of the rails 11 are connected each other, thus the rails 11 can be laid at 360° in the overall perimeter. These connected rails 11 are disposed between the shroud support legs 5 and the reactor pressure vessel 1 at directly below the shroud support plate 4. The shroud support legs 5 arranged in a circumferential direction of the shroud support cylinder 3 is surrounded by the connected rails 11 disposed directly below the shroud support plate 4. The repair device 12 is inserted at directly below the shroud support plate 4 through an opening portion 71, which is formed between the shroud support legs 5, from the vicinity of the repair place and set on the rail 11. The repair device 11 moves along the coupled rails 11 within the laying range of the rails 11, so that cracked places of the weld over a wide range can be repaired efficiently.

A setting procedure of the arm development repair apparatus 70 of the present embodiment will be explained by referring to FIGS. 4 to 12.

Figure 4:
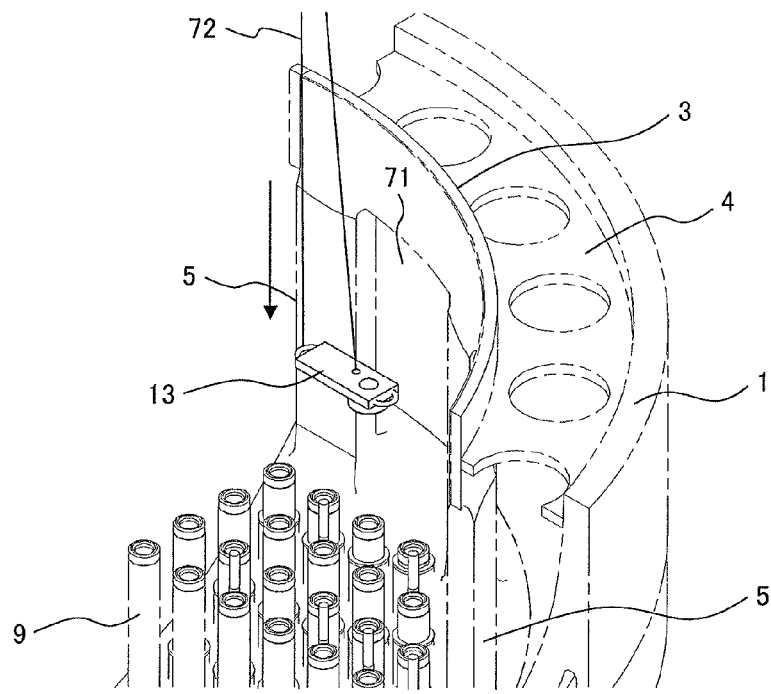
FIG. 4 is a partial perspective view showing an inside of a lower portion of a reactor pressure vessel setting a support base of an arm development repair apparatus in embodiment 1 of the present invention.

With respect to the setting of the arm development repair apparatus 70 of the present embodiment, firstly, the support base 13 is set. The support base 13 is set at the upper ends of the CRD housings 9 in two places, so that the support base 13 hanging by a wire 72 hanged from a ceiling crane (not shown) passes through a narrow place such as an opening portion (not shown) formed in the core support plate 8 in a lengthwise posture, and then as shown in FIG. 4, changes to a horizontal posture, and is seated on the tops of the CRD housings 9.

Figure 5:
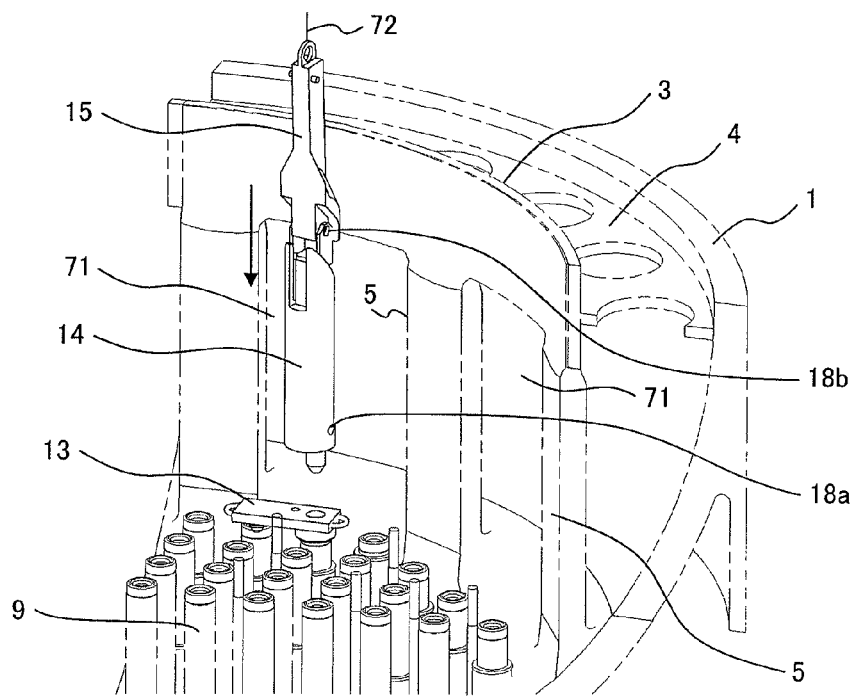
FIG. 5 is a partial perspective view showing an inside of a lower portion of a reactor pressure vessel in a state that a support apparatus is set on a support base seated on an upper end of control rod drive mechanism housing shown in FIG. 4.

Thereafter, as shown in FIG. 5, the support apparatus 14 is hanged down on the support base 13. At this time, the rail guide member 15 is connected to the support apparatus 14 with pins 18a and 18b and is set on the support base 13 in the state that it is positioned in the axial direction of the support apparatus 14. Each CRD housing 9 on which each of the support apparatus 14 is set is a part of all the CRD housings 9 installed to a bottom head of the reactor pressure vessel 1, and is disposed in a outermost region of CRD housing array.

Figure 6:
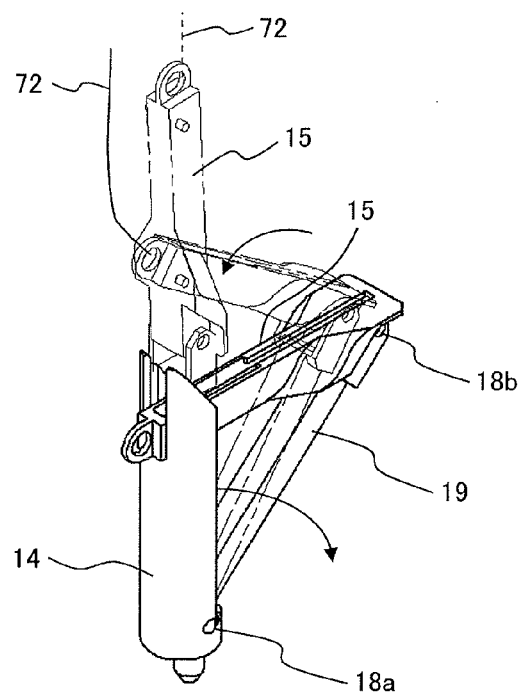
FIG. 6 is a partial perspective view showing a support apparatus in which a rail guide member was horizontally fallen down.

In addition, as shown in FIG. 6, the pin 18a is positioned at a lower end portion of the support apparatus 14 and is connected to a beam 19, and on the other hand, the rail guide member 15 is connected to the beam 19 by the pin 18b. A wire 72 connected to the upper end of the rail guide member 15 is loosened after seated, thus the beam 19 falls down in the radius direction, and so as to follow it, the rail guide member 15 falls down similarly by rotating in a axial direction of the reactor pressure vessel 1 and is horizontally positioned. As a consequence, the rail guide member 15 is set perpendicularly, that is, horizontally in a groove formed in an upper end portion of the support apparatus 14. At this time, the rail guide member 15 is inserted in the opening portion 71 and an end of the rail guide member 15 reaches directly below the shroud support plate 4.

Figure 7:
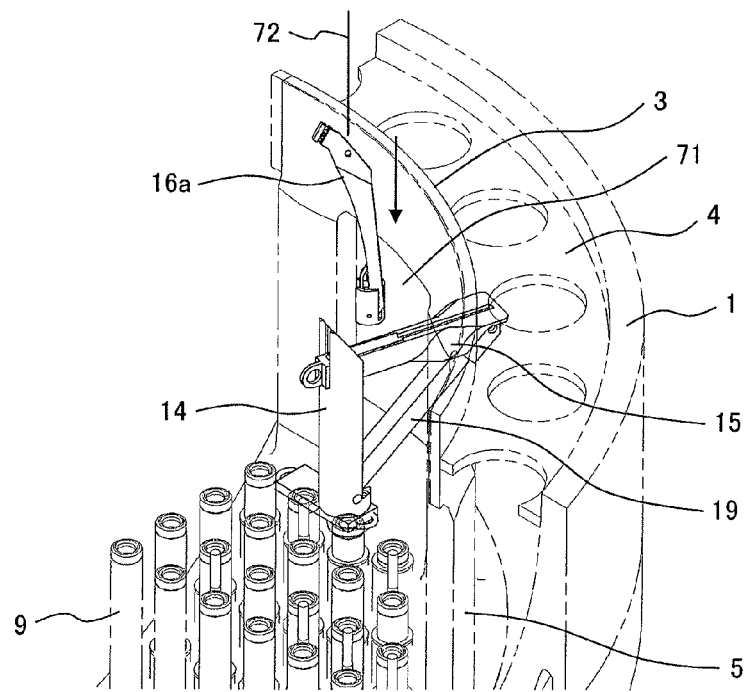
FIG. 7 is a partial perspective view showing an inside of a lower portion of a reactor pressure vessel in a state that a support arm is hanged down after a state shown in FIG. 6.
Figure 8:
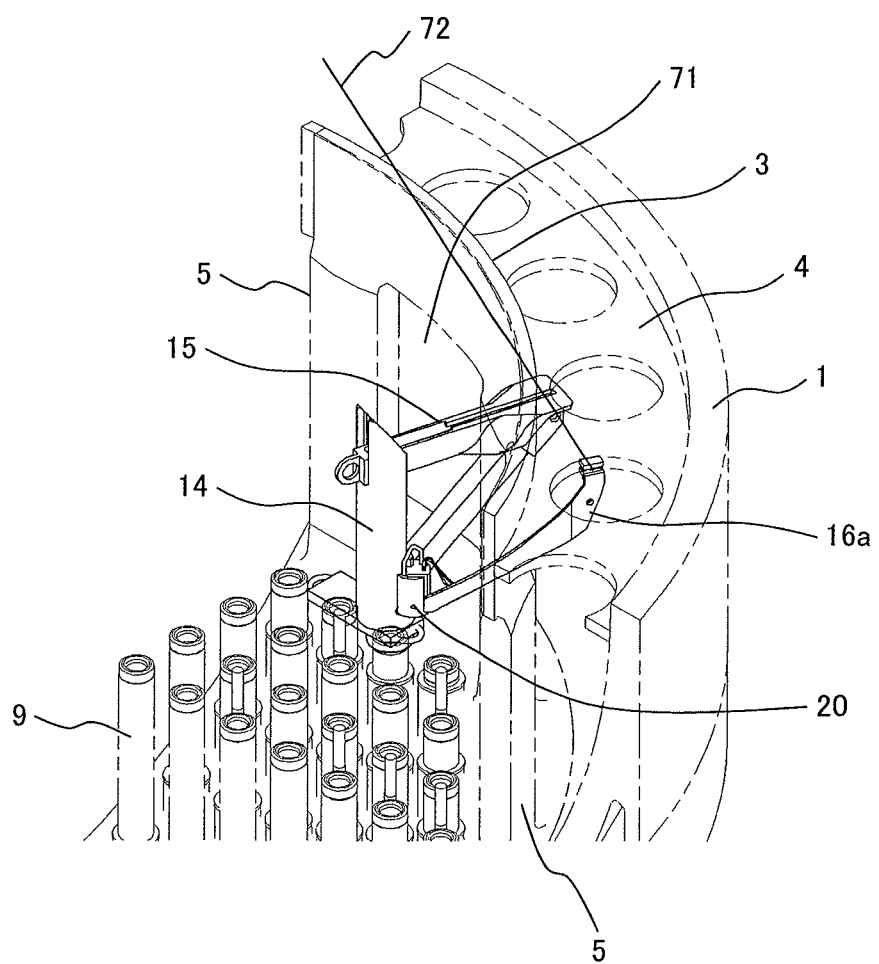
FIG. 8 is a partial perspective view showing an inside of a lower portion of a reactor pressure vessel in a state that a support arm is set after a state shown in FIG. 7.

Next, as shown in FIG. 7, the support arm 16a is hanged down on one side of the support apparatus 14. As shown in FIG. 8, the support arm 16a falls down at a fulcrum of a pin 20 by loosening the wire 72 after the support arm 16a is seated on the support apparatus 14 and reaches the vicinity of the inner surface of the reactor pressure vessel 1 through the opening portion 71. Similarly, the support arm 16b is installed on the opposite side of the support apparatus 14. At this time, the support arms 16a and 16b are disposed in the state that the angle is opened toward the leading edge side of the support arms at a center of the support apparatus 14.

Figure 9:
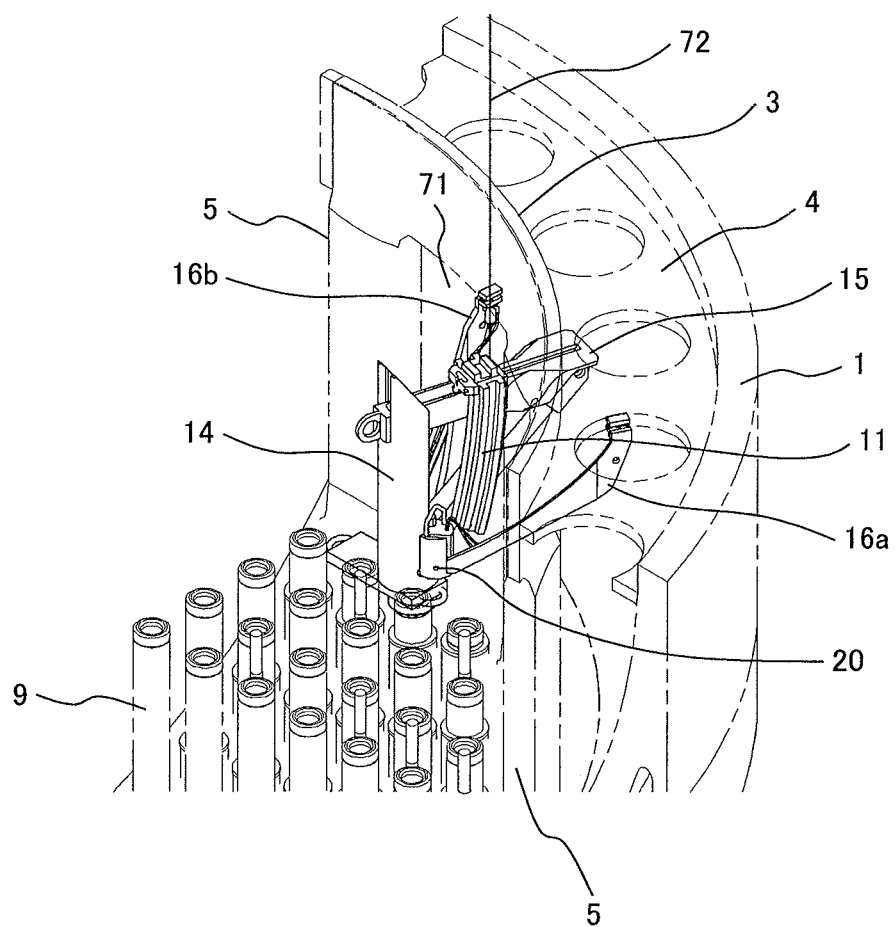
FIG. 9 is a partial perspective view showing an inside of a lower portion of a reactor pressure vessel in a state that a rail is set on a rail guide member after a state shown in FIG. 8.
Figure 10:
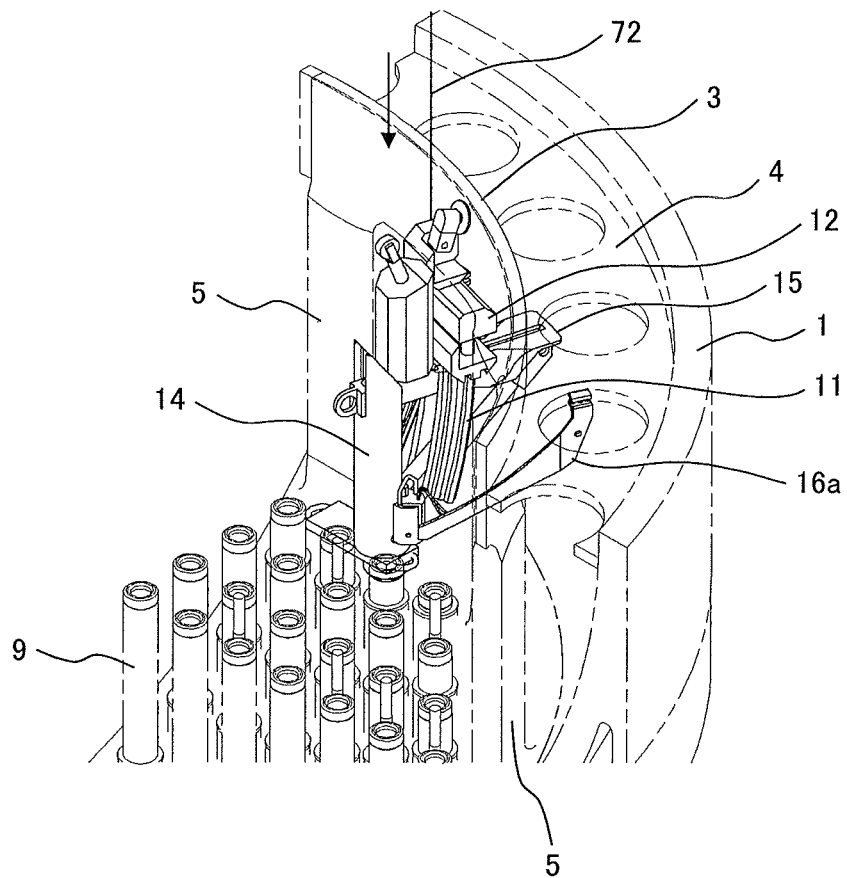
FIG. 10 is a partial perspective view showing an inside of a lower portion of a reactor pressure vessel in a state that a repair device is set on a rail after a state shown in FIG. 9.

Next, as shown in FIG. 9, the bent rail 11 is hanged down. The reason is that the opening portions of the upper grid plate 7 and the core support plate 8 are narrow and the long rail 11 cannot pass through in the present state, so that the rail 11 is hanged down in the bent state. After the rail 11 is set on the rail guide member 15 and moved directly below the shroud support plate 4, the bent portions of the rail 11 are spread. In the bent state, the rail 11 is seated on the top of the rail guide member 15. The rail guide member 15 is provided with a concave groove at the center in the guide direction. When the rail 11 is seated, the convex portion existing on a lower portion of each bent portion of the rail 11 is fitted into the groove of the rail guide member 15. The rail 11 spread and disposed directly below the shroud support plate 4 is set on each upper end of the rail guide member 15 and the support arms 16a and 16b and supported by these. Thereafter, as shown in FIG. 10, the repair device 12 is set on the rail 11.

Further, in the arrangement of the rails 11, when the repair device 12 is not set in the proper position and only the rails are assembled, the operation of setting the repair device 12 is removed and the next process is performed.

Figure 11:
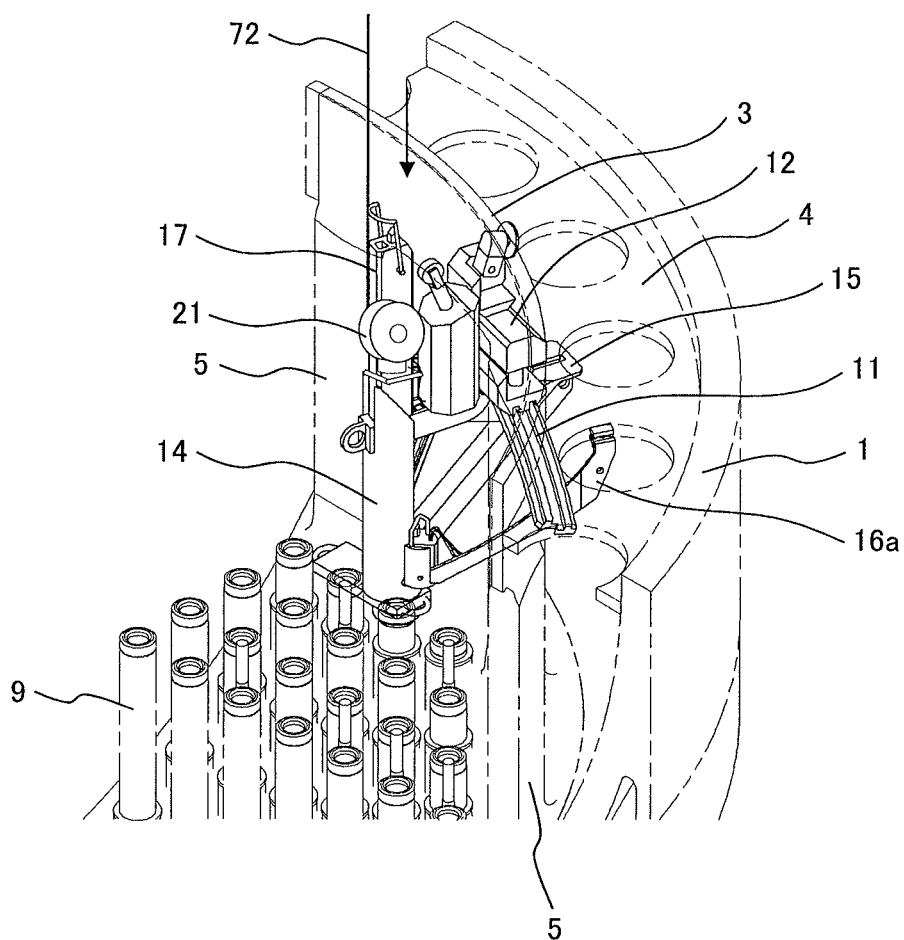
FIG. 11 is a partial perspective view showing an inside of a lower portion of a reactor pressure vessel in a state that a rail push-out apparatus is set on a support apparatus after a state shown in FIG. 10.
Figure 12:
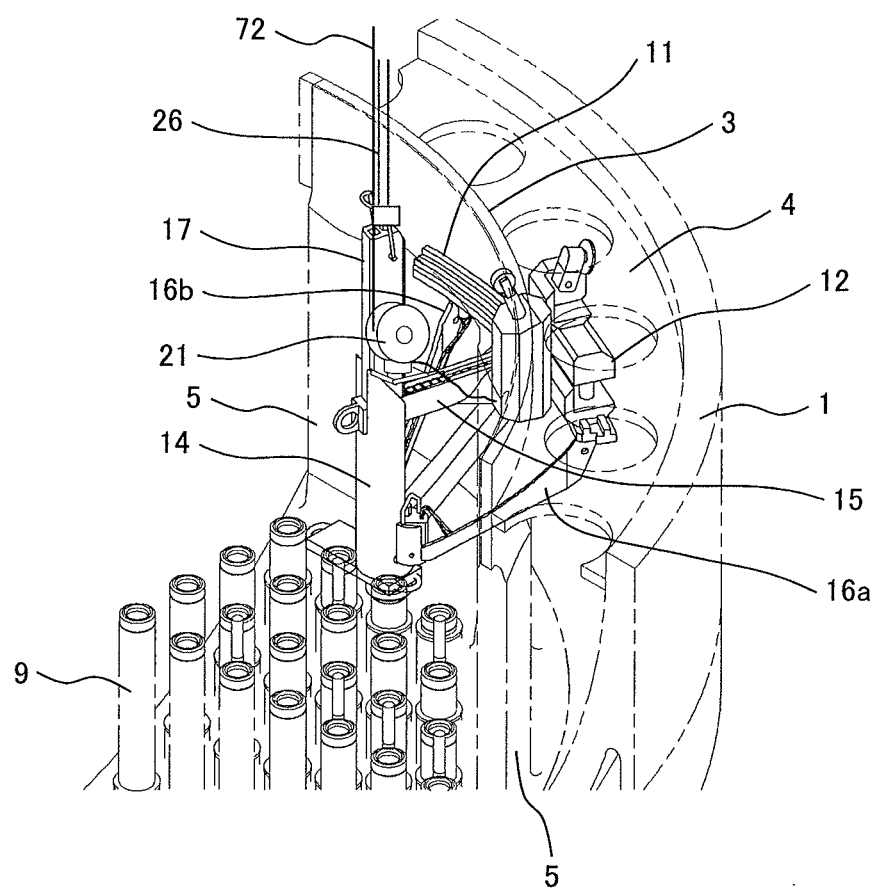
FIG. 12 is a partial perspective view showing an inside of a lower portion of a reactor pressure vessel in a state that a rail is pushed out along a rail guide member toward an inner surface of a reactor pressure vessel by a rail push-out apparatus and set directly below a shroud support plate after a state shown in FIG. 11.

Next, the rail push-out apparatus 17 is hanged down and is set on the support apparatus 14, as shown in FIG. 11, after the repair device 12 is movably set on the rails 11. The rail push-out apparatus 17 pushes out the rail 11 toward the inner surface of the reactor pressure vessel 1 along the rail guide member 15 through the opening portion 71, as shown in FIG. 12. A pulley 21 for guiding a cable to be connected to the repair device 12 is mounted to the side of the rail push-out apparatus 17. However, the installation of the pulley 21 is excluded when the repair device 12 is not set and only the rail 11 is set.

Figure 13:
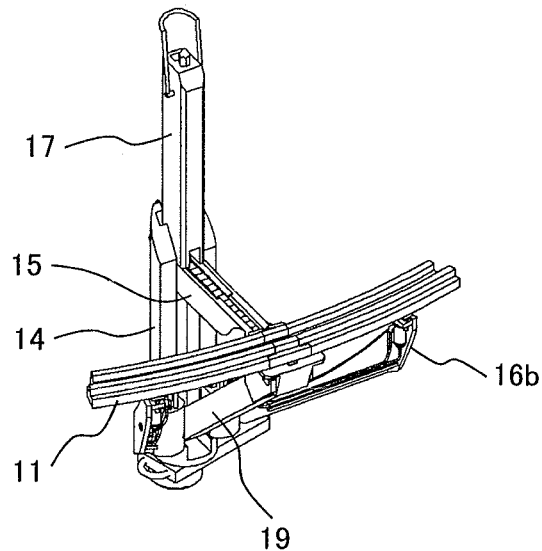
FIG. 13 is a perspective view showing a rail push-out apparatus used in embodiment 1 of the present invention.
Figure 14:
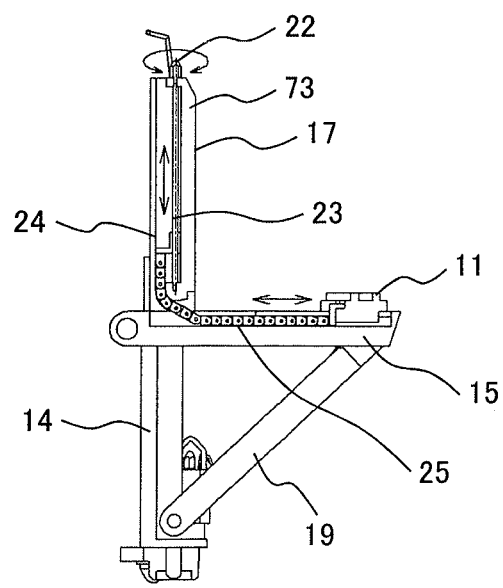
FIG. 14 is a side view showing a rail push-out apparatus shown in FIG. 13.

FIGS. 13 and 14 show the rail push-out apparatus 17. As shown in the drawings, the rail push-out apparatus 17 is provided with an apparatus body 73, a bolt 22 rotatably attached to an upper end portion of the apparatus body 73, a ball screw 23 rotatably attached to the apparatus body 73 and connected to the bolt 22, a table 24 for vertically moving by the rotation operation of the ball screw 23, and a conveyer type chain 25 connected to a lower surface of the table 24. The table 24 is movably mounted to the apparatus body 73.

Further, the conveyer type chain 25 has a structure that inner links and outer links are assembled alternately and a roller is installed in the position of the connection pin of each link.

The bolt 22 is rotated by inserting a socket ball 26 from above, thus the ball screw 23 is rotated, and the table 24 descends. At that time, the conveyer type chain 25 attached to the lower surface of the table 24 is pushed down. The chain 25 in which a plurality of links is connected to each other is bent in the horizontal direction along the rail guide member 15 positioned in an orthogonal direction to the rail push-out apparatus 17, moves along groove formed in the rail guide member 15, pushes out the convex portion of the rail 11 fitted into the groove, and moves the rail 11 to the leading edge of the rail guide member 15 through the opening portion 71 (see FIGS. 13 and 14). The rail 11 positioned on the leading edge of the rail guide member 15 is disposed directly below the shroud support plate 4.

Since the support arms 16a and 16b are set in a state that the top thereof has a curvature shape, the bent rail 11 is pushed out along the upward curvature line of the support arms 16a and 16b, are spread gradually, and become one successive rail 11 at the leading edge of the rail push-out guide 15. When coupling the rails 11 on the circumference between the shroud support legs 5 and the inner surface of the reactor pressure vessel 1, similarly to this procedure, all the rails 11 moved directly below the shroud support plate 4 through each of the opening portions 71 formed between all the shroud support legs 5 are assembled each other at the adjoining position.

According to the present embodiment, for the weld H9 between the inner surface of the reactor pressure vessel 1 and the shroud support plate 4, the time required for the repair operation can be shortened and a highly reliable repair operation can be performed.

Further, in the present embodiment, an example that an object of the weld H9 between the inner surface of the reactor pressure vessel 1 and the shroud support plate 4 is repaired is explained, however, the similar method can be applied to the repair of the weld H8 between the shroud support cylinder 3 and the shroud support plate 4, by setting in an inward direction of repair device 12 and shortening push-out distance of the rail 11 in the radius direction by the rail push-out apparatus 17. Further, the similar method to the method applied to the weld H8 can be applied to the weld H10 between the shroud support cylinder 3 and each of the shroud support legs 5 by lowering the support apparatus 14 and the support arms 16a and 16b in an axial direction of the reactor pressure vessel 1.

The weld H9 between the inner surface of the reactor pressure vessel 1 and the shroud support plate 4, the weld H8 between the shroud support cylinder 3 and the shroud support plate 4, and an outside half of thickness of the weld H10 between the shroud support cylinder 3 and the shroud support legs 5 are positioned outside the shroud support legs 5, so that a curvature surface of a bottom head of the reactor pressure vessel 1 is positioned directly below the shroud support plate 4, and a structure for supporting the rail 11 does not exist.

Further, since a lower region existing directly below the shroud support plate 4 and formed between the reactor pressure vessel 1 and the shroud support legs 5 is positioned outside the positions of the upper grid plate 7 and the core support plate 8, the lower region cannot be accessed from the upper portion of the reactor pressure vessel 1 through the annulus portion 40. Accordingly, the remote setting of the rail 11 and a support mechanism indicated in the present embodiment are necessary.

However, the weld H11 between the inner surface of the reactor pressure vessel 1 and the shroud support leg 5, the weld H7 between the shroud support cylinder 3 and the lower portion of the core shroud 6, and an inside half of thickness of the weld H10 between the shroud support cylinder 3 and the shroud support legs 5 are positioned inside the shroud support legs 5 and the shroud support cylinder 3, and can be accessed through the opening portions individually formed the upper grid plate 7 and core support plate 8 from the upper portion of the reactor pressure vessel 1, and there exist the CRD housings 9 at any position on the circumference below the welds, so that the complicated mechanism used in the present embodiment is unnecessary, and the rails 11 can be set by being seated the rails 11 at the upper ends of the CRD housings 9 and coupling the respective rails 11. Further, when raising the height level, the intervals between the CRD housings 9 and the rails 11 can be increased.

[Embodiment 2]

Figure 15:
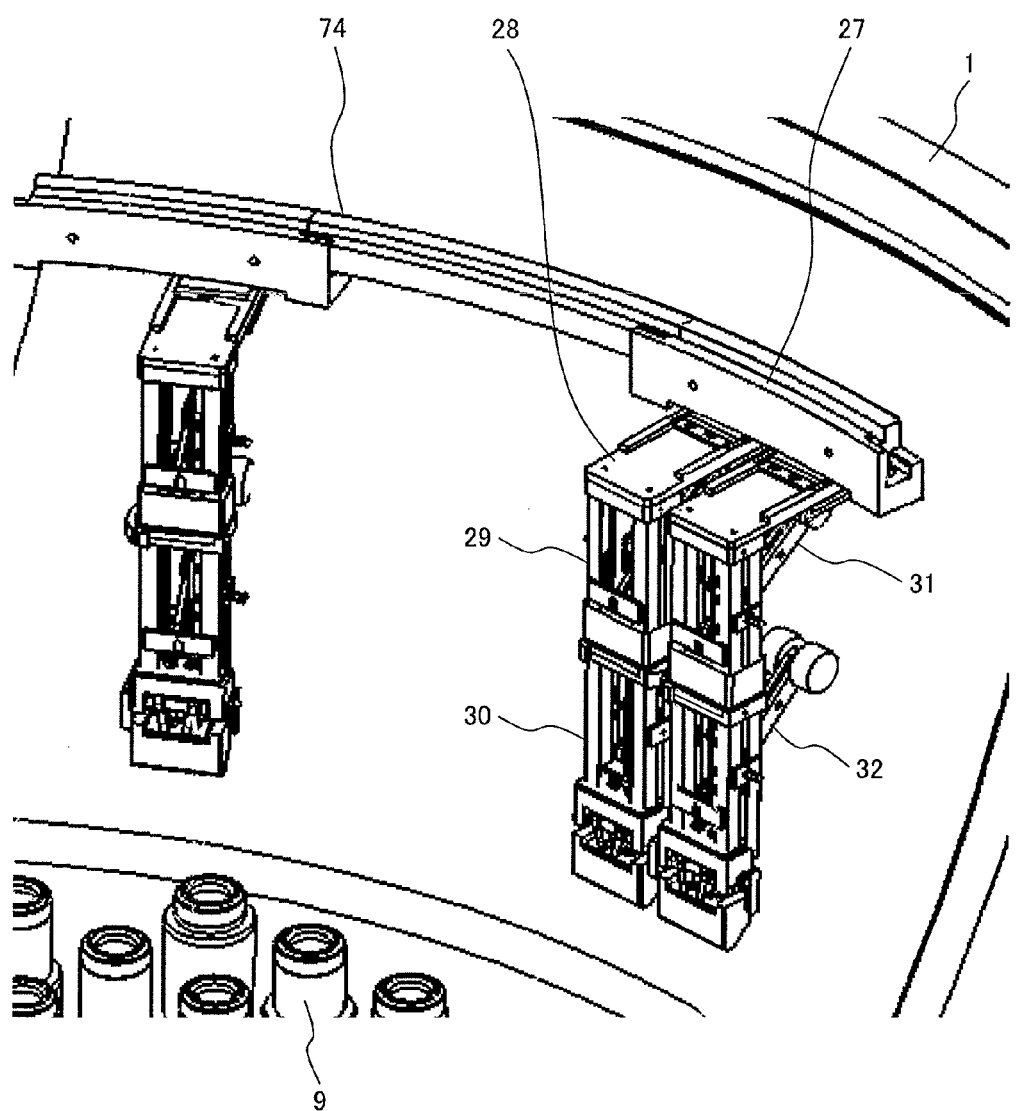
FIG. 15 is a partial perspective view showing a pile-up repair apparatus according to embodiment 2, which is another preferred embodiment of a shroud support repair apparatus of the present invention, installed in a lower portion of a reactor pressure vessel.

A pile-up repair apparatus according to embodiment 2, which is another preferred embodiment of a shroud support repair apparatus of the present invention, will be explained by referring FIG. 15. The pile-up repair apparatus 74 of the present embodiment shown in FIG. 15 is installed in the reactor pressure vessel 1 shown in FIG. 1, similarly to the arm development correction apparatus 70 of embodiment 1. The pile-up repair apparatus 74 is applied to the boiling water nuclear power plant.

The pile-up repair apparatus 74 of the present embodiment shown in FIG. 15 is an example of the rail assembly system and is provided with a plurality of rails 27 set along the circumference of the lower surface of the weld of the shroud support plate 4, a plurality of rail support apparatuses 28 for supporting the rails 27, and a plurality of second support apparatuses. Each second support apparatus includes an upper portion support apparatuses 29 and a lower portion support apparatuses 30. The upper portion support apparatus 29 is supported by the lower portion support apparatus 30 and the rail support apparatus 28 is supported by an upper end of the upper portion support apparatus 29.

The shroud support legs 5 are arranged at 12 places at established intervals in a circumferential direction of the shroud support cylinder 3 and installed on an inner surface of the bottom head of the reactor pressure vessel 1. The upper portion support apparatus 29 and the lower portion support apparatus 30 are installed in line with each other between the outside of the shroud support legs 5 and the inside of the reactor pressure vessel 1. Each load of the upper portion support apparatus 29 and the lower portion support apparatus 30 is applied to the shroud support legs 5. Falling prevention of the upper portion support apparatus 29 and the lower portion support apparatus 30 is realized by a lower support arm 32 mounted to the lower portion support apparatus 30 and made contact with the inner surface of the bottom head of the reactor pressure vessel 1. Thus an independent structure of the upper portion support apparatus 29 and the lower portion support apparatus 30 is established. The rail support apparatus 28 is supported by the upper end of the upper portion support apparatus 29 and an upper support arm 31 mounted to the upper portion support apparatus 29.

These rails 27 are similarly set through each opening portion 71 at 11 places of the other shroud support legs 5, thus the rails 27 can be laid at 360° in the overall perimeter between the reactor pressure vessel 1 and the shroud support legs 5. The shroud support legs 5 arranged in a circumferential direction of the shroud support cylinder 3 is surrounded by the laid rails 27 disposed directly below the shroud support plate 4. As a consequence, the similar effects to the arm development correction apparatus of embodiment 1 can be obtained.

A setting procedure of the pile-up repair apparatus 74 of the present embodiment will be explained by referring to FIGS. 16 to 31.

The setting of the pile-up repair apparatus 74 is to firstly set the lower portion support apparatus 30 on the inner surface of the bottom head of the reactor pressure head 1 using an operation apparatus 33 while making contact with the outer surface of the shroud support legs 5, and successively pile up the upper portion support apparatus 29 on an upper end of the lower portion support apparatus 31 thereon.

Figure 16:
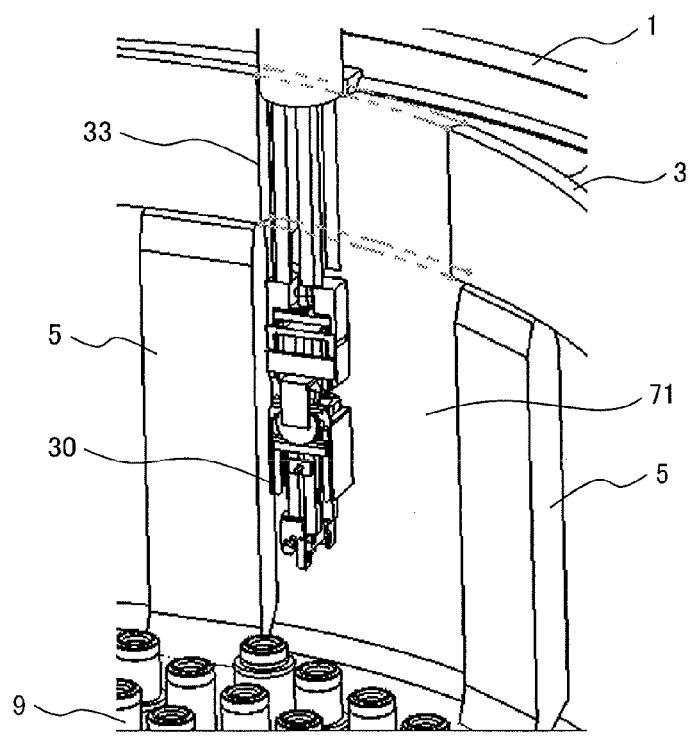
FIG. 16 is a partial perspective view showing a lower portion support apparatus of a pile-up repair apparatus, which was hanged down to a position of a shroud support leg in a reactor pressure vessel.
Figure 17:
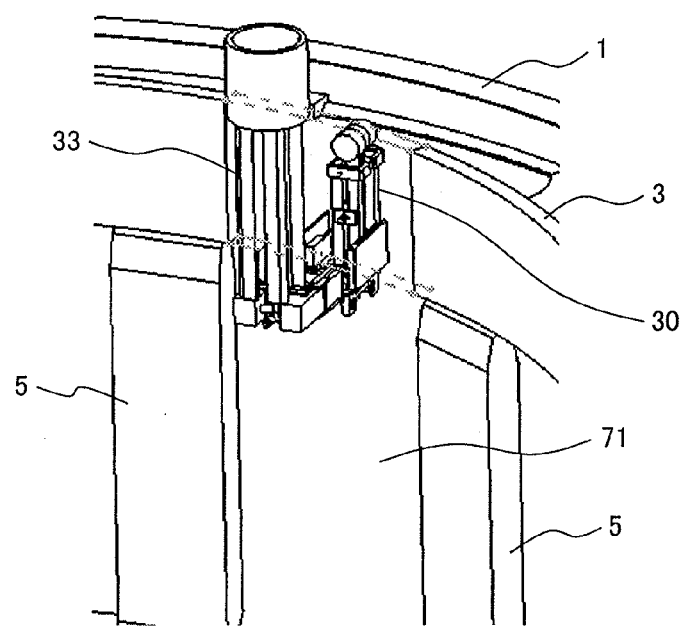
FIG. 17 is a partial perspective view showing a lower portion support apparatus in a state that an operation arm of the lower portion support apparatus was bent upward after a state shown in FIG. 16.
Figure 18:
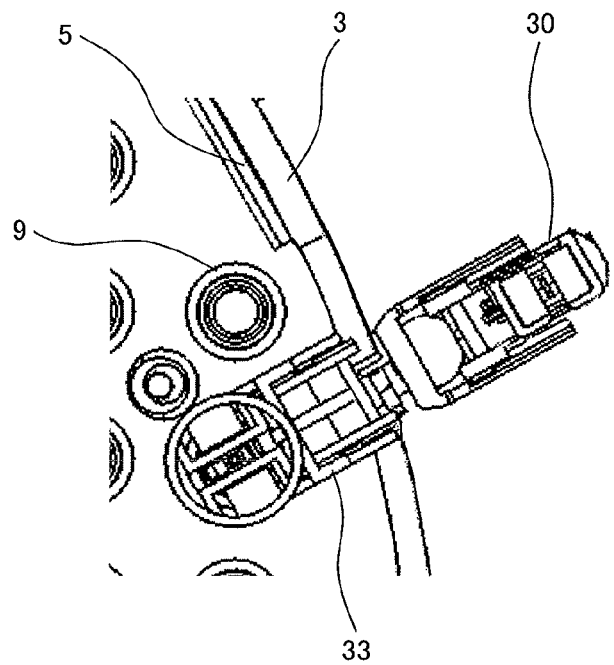
FIG. 18 is a plan view showing a lower portion support apparatus an operation arm of which was bent upward.
Figure 19:
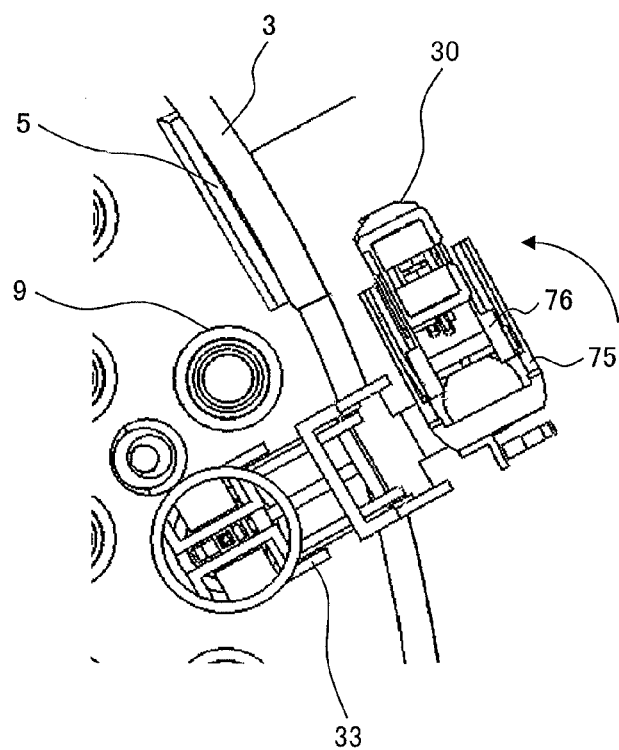
FIG. 19 is a plan view showing a lower portion support apparatus an operation arm of which was bent leftward.
Figure 20:
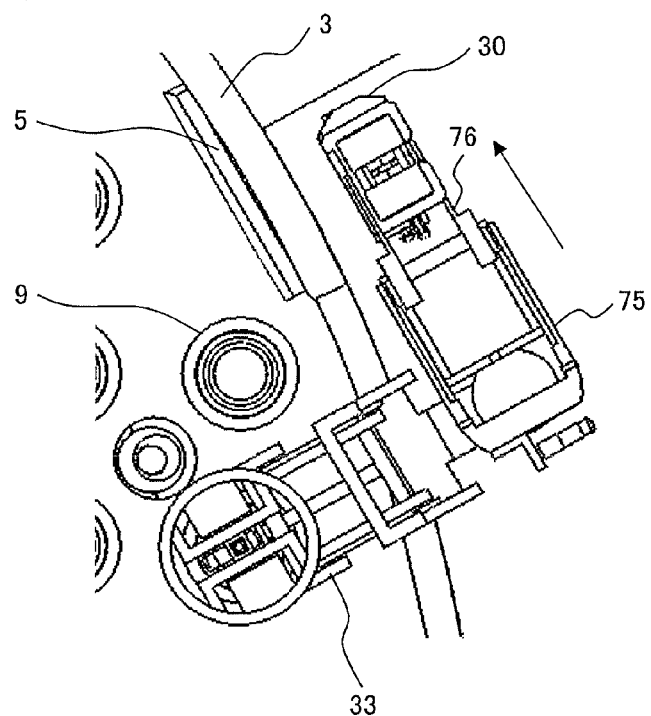
FIG. 20 is a plan view showing a lower portion support apparatus in a state that the lower portion support apparatus is moved to a rear side of a shroud support leg.
Figure 21:
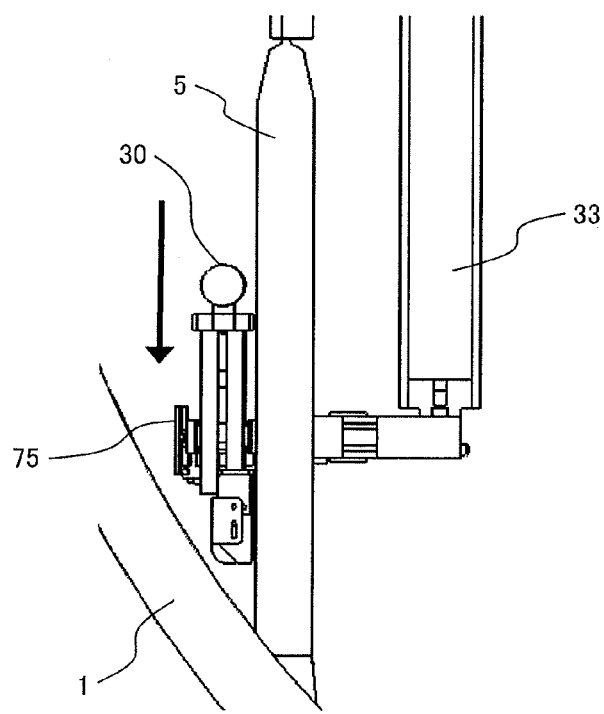
FIG. 21 is a side view showing a lower portion support apparatus in a state that the lower portion support apparatus is set in a rear side of a shroud support leg.
Figure 22:
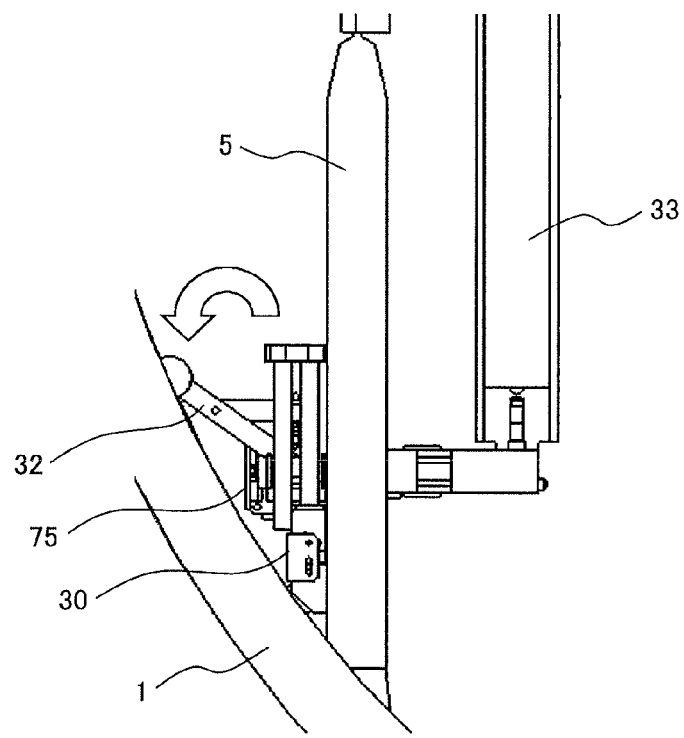
FIG. 22 is a side view showing a lower portion support apparatus in a state that a support arm of the lower portion support apparatus was fallen down on an inner surface of a reactor pressure vessel and the lower portion support apparatus is prevented from falling after a state shown in FIG. 21.

Firstly, as shown in FIG. 16, the operation apparatus 33 passes through a narrow place such as the opening portion formed in the core support plate 8 in the state of downward holding the lower portion support apparatus 30 and is hanged down to the reactor bottom. Next, the operation apparatus 33 is bent upward between the shroud support legs 5 (see FIG. 17), and the lower portion support apparatus 30 is transported outside the shroud support legs 5 through the opening portion 71 by the operation apparatus 33 (see FIG. 18). After the transportation of the lower portion support apparatus 30, the operation apparatus 33 is bent sideways, directs a leading edge portion 76 of an arm 75 of the operation apparatus 33 toward the rear side of the shroud support legs 5 (see FIG. 19). Further, the operation apparatus 33 expands the leading edge portion 76 of an arm 75 (see FIG. 20), and descends, and sets the lower portion support apparatus 30 on the bottom head (see FIG. 21). Thereafter, as shown in FIG. 22, the operation apparatus 33 pushes the lower support arm 32 down toward the inner surface of the reactor pressure vessel 1 and makes the lower portion support apparatus 30 independent. At this time, a leading edge of the lower support arm 32 is making contact with the inner surface of the reactor pressure vessel 1 and this lower portion support apparatus 30 is disposed directly below the shroud support plate 4.

Figure 23:
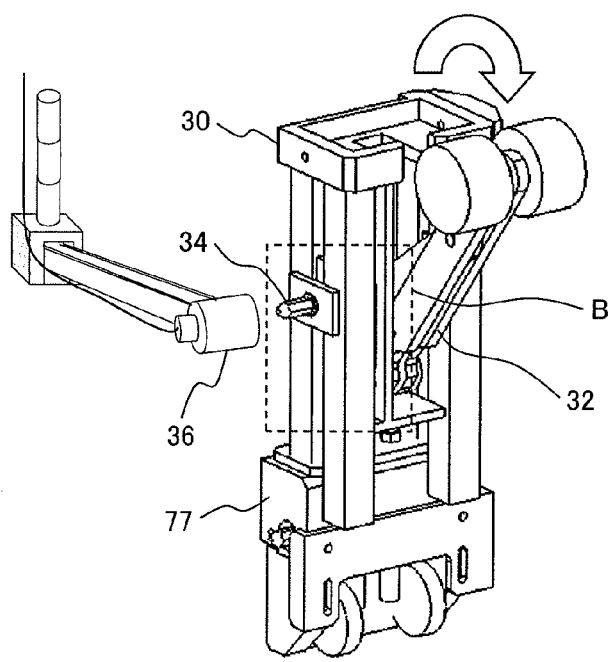
FIG. 23 is a perspective view showing a lower portion support apparatus used in embodiment 2 of the present invention.
Figure 24:
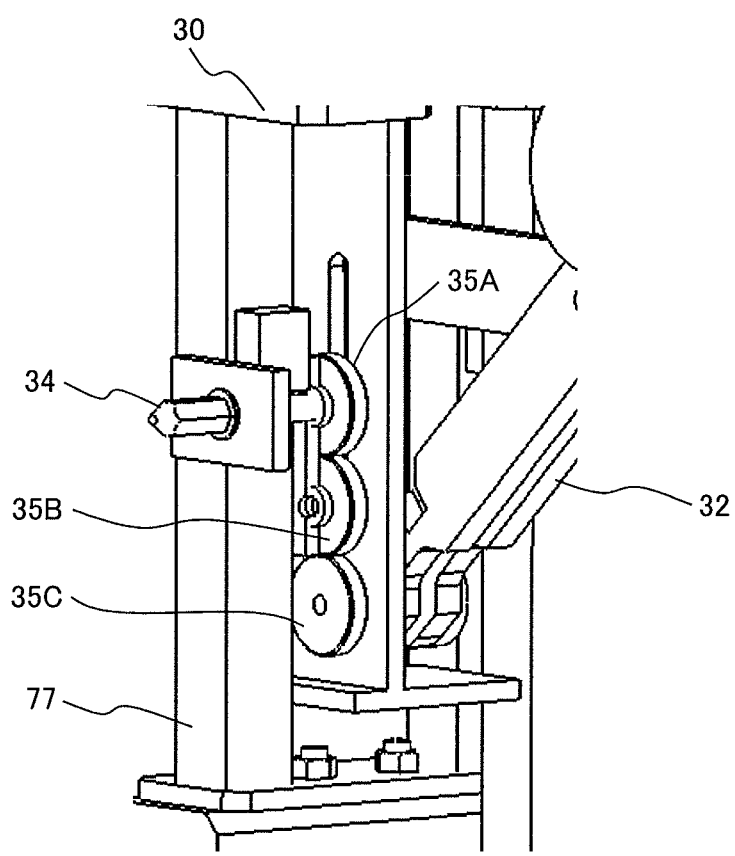
FIG. 24 is an enlarged view of a portion B shown in FIG. 23.

A structure of the lower support arm 32 is shown in FIGS. 23 and 24. As shown in the drawing, a bolt 34 is rotatably mounted to the side of an apparatus body 77, a gear 35 is attached to the bolt 34, and gears 35B and 35C are rotatably mounted to the apparatus body 77. The gear 35B engages with the gears 35A and 35C. A lower end portion of the lower support arm 32 is connected to a rotating shaft attached to the gear 35C. If the bolt 34 is rotated, the lower support arm 32 can be rotated via the gears 35A, 35B and 35C. A socket wrench 36 in which a torque motor is embedded is set on the bolt 34 by an operation pole (not shown) or the operation apparatus 33 and the rotation of the bolt 34 is performed by rotating the socket wrench 36.

Figure 25:
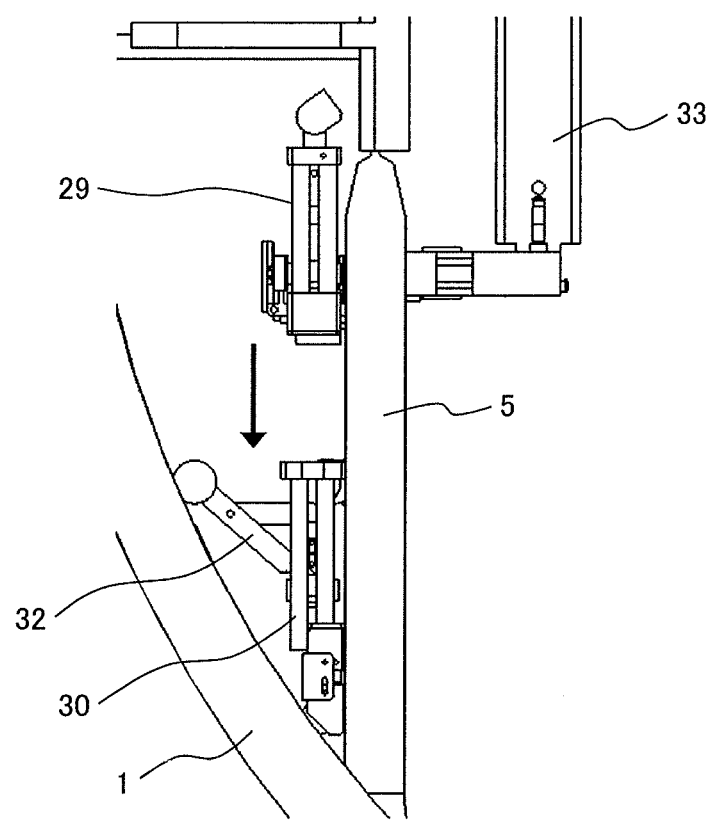
FIG. 25 is an explanatory drawing showing a state that an upper portion support apparatus is installed after a state shown in FIG. 22.
Figure 26:
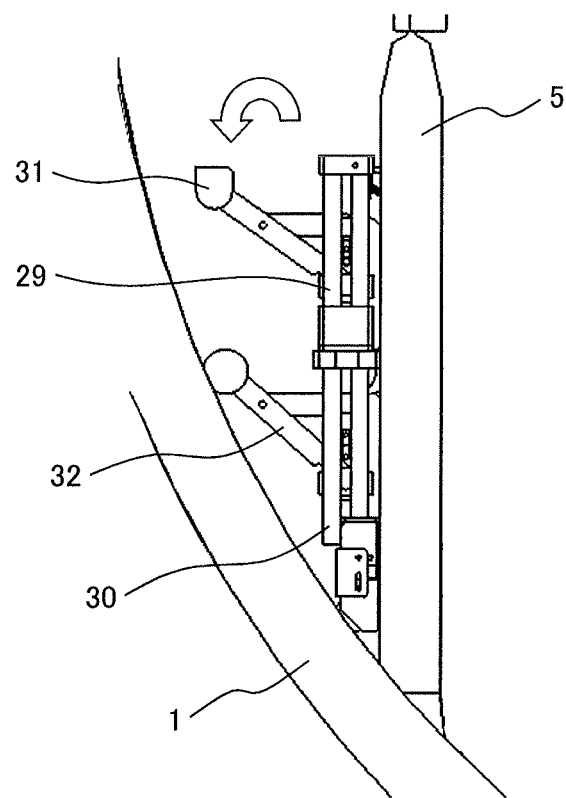
FIG. 26 is a side view showing an upper portion support apparatus installed on a lower portion support apparatus and a support arm of which was fallen down toward an inner surface of a reactor pressure vessel after a state shown in FIG. 25.
Figure 27:
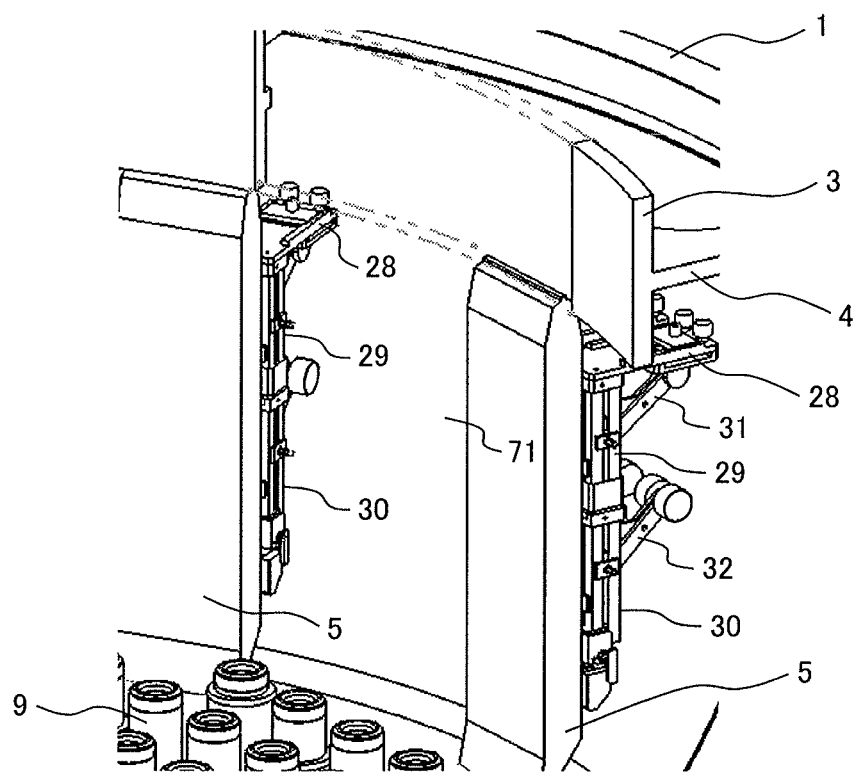
FIG. 27 is a partial perspective view showing an inside of a lower portion of a reactor pressure vessel in a state that a rail support apparatus is installed on an upper portion support apparatus after a state shown in FIG. 26.

As shown in FIG. 25, the upper portion support apparatus 29 is set on the upper end of the lower portion support apparatus 30. The setting of the upper portion support apparatus 29 is performed by using the operation apparatus 33 similarly to the lower portion support apparatus 30 and the procedure is the same. Thereafter, as shown in FIG. 26, the upper support arm 31 is rotated by using the similar structure shown to FIGS. 23 and 24 and mounted in the upper portion support apparatus 29, falls down toward the inner surface of the reactor pressure vessel 1. The rail support apparatus 28 is set on an upper end of the upper support arm 31 by the operation apparatus 33 (see FIG. 27).

Figure 28:
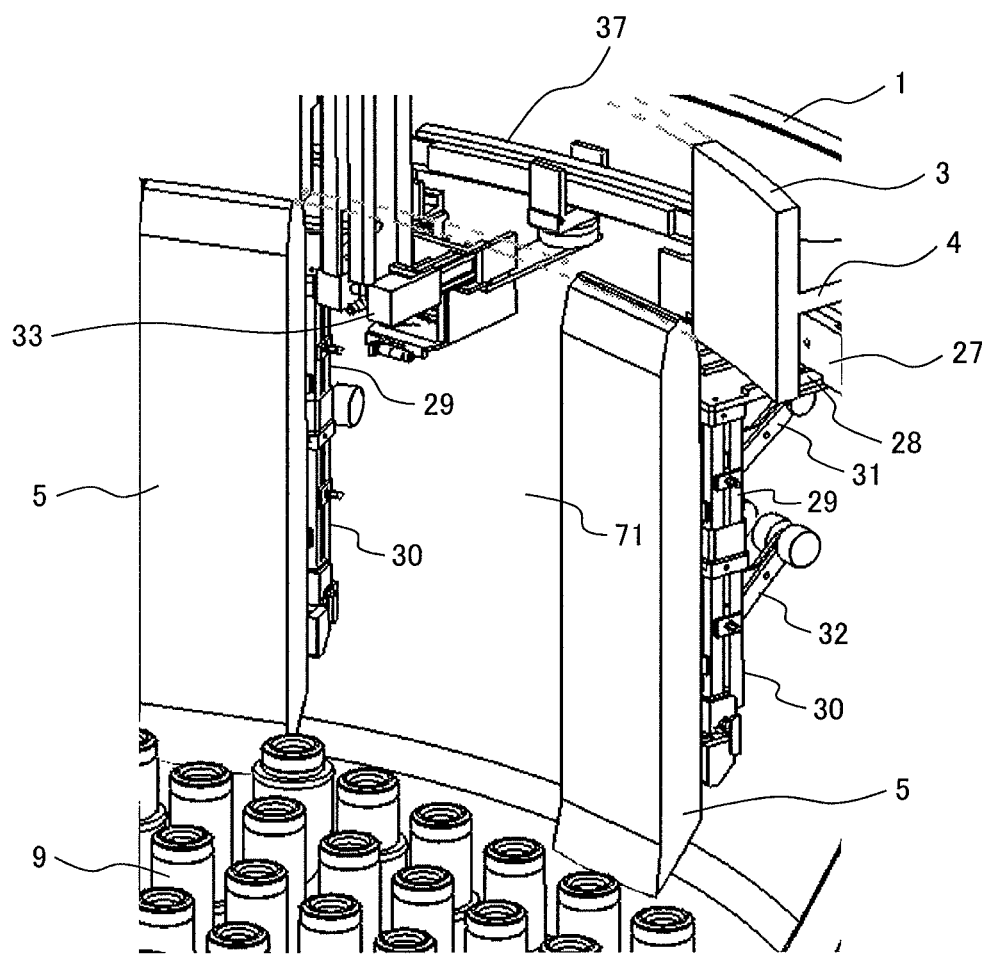
FIG. 28 is a partial perspective view showing an inside of a lower portion of a reactor pressure vessel in a state that rails are set on the rail support apparatus after a state shown in FIG. 27.
Figure 29:
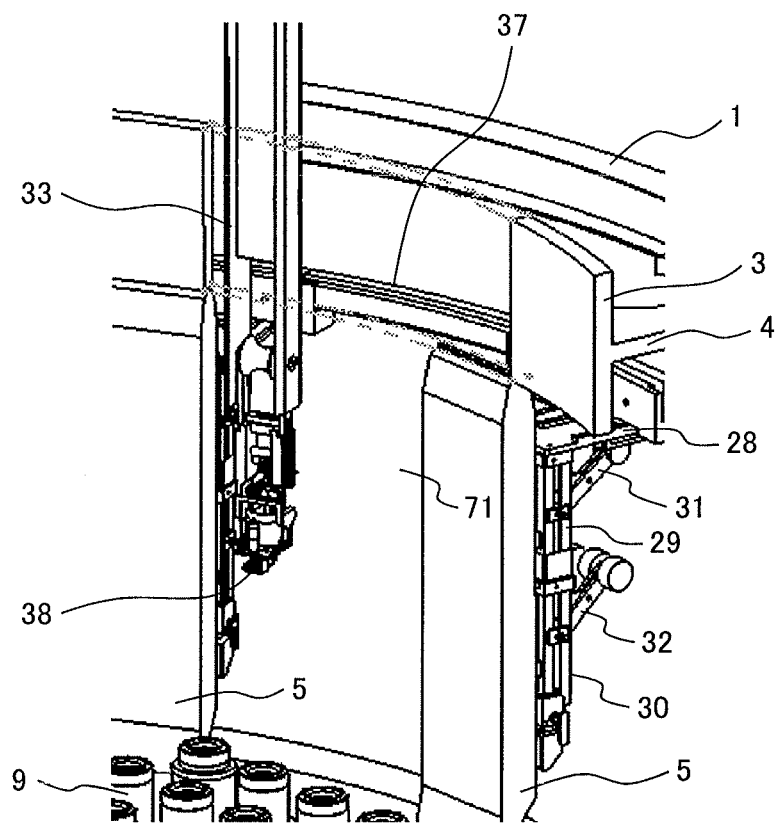
FIG. 29 is a partial perspective view showing an inside of a lower portion of a reactor pressure vessel in a state that a repair device is hanged down to a reactor bottom by an operation apparatus after a state shown in FIG. 28.
Figure 30:
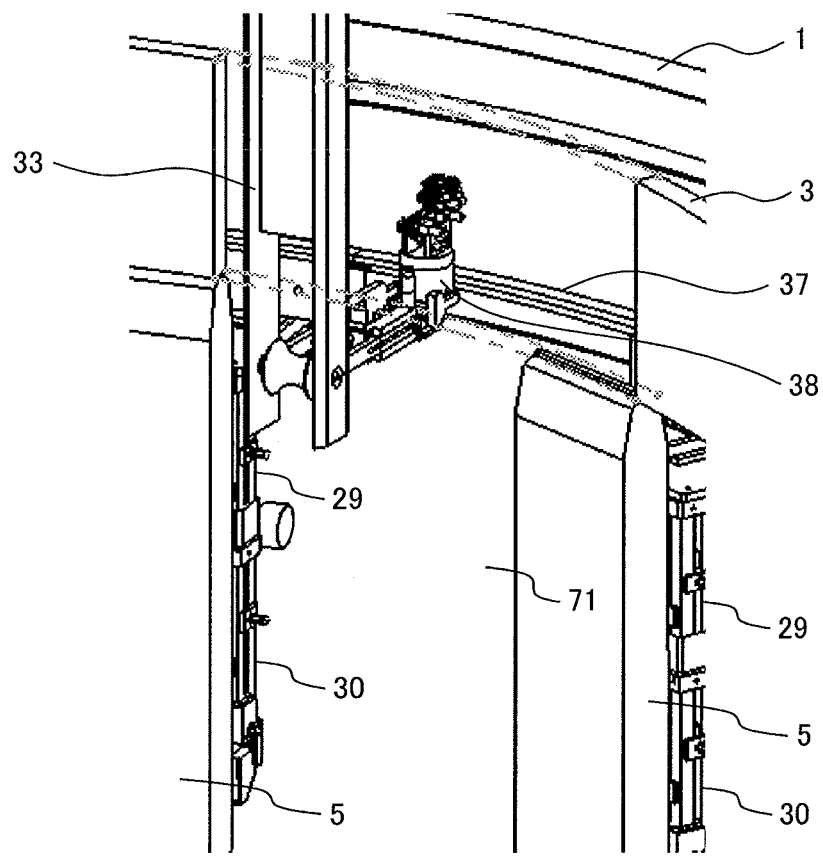
FIG. 30 is a partial perspective view showing an inside of a lower portion of a reactor pressure vessel in a state that a repair device is transferred toward a rail through an opening portion formed between shroud support legs after a state shown in FIG. 29.

Next, the installation of the rail 27 will be explained. As shown in FIG. 28, each rail 27 is transferred outside the shroud support legs 5 through the opening portion 71 by the operation apparatus 33 and is set on an upper surface of the rail support apparatus 28. Continuously, each medium rail 37 is transferred outside the shroud support legs 5 through the opening portion 71 and inserted between the rails 27 being adjacent to each other in a circumferential direction of the reactor pressure vessel 1 by the operation apparatus 33. Both end portion of the medium rail 37 are coupled to two rails 27 being adjacent to the inserted medium rail 37. Finally, a repair device 38 is set on the medium rail 37 by the operation apparatus 33. As shown in FIGS. 29 and 30, the repair device 38 is hanged down to the reactor bottom by the operation apparatus 33, and the operation apparatus 33 is bent upward through the opening portion 71. Thus, the repair device 38 is transferred toward the medium rail 37 through the opening portion 71.

Figure 31:
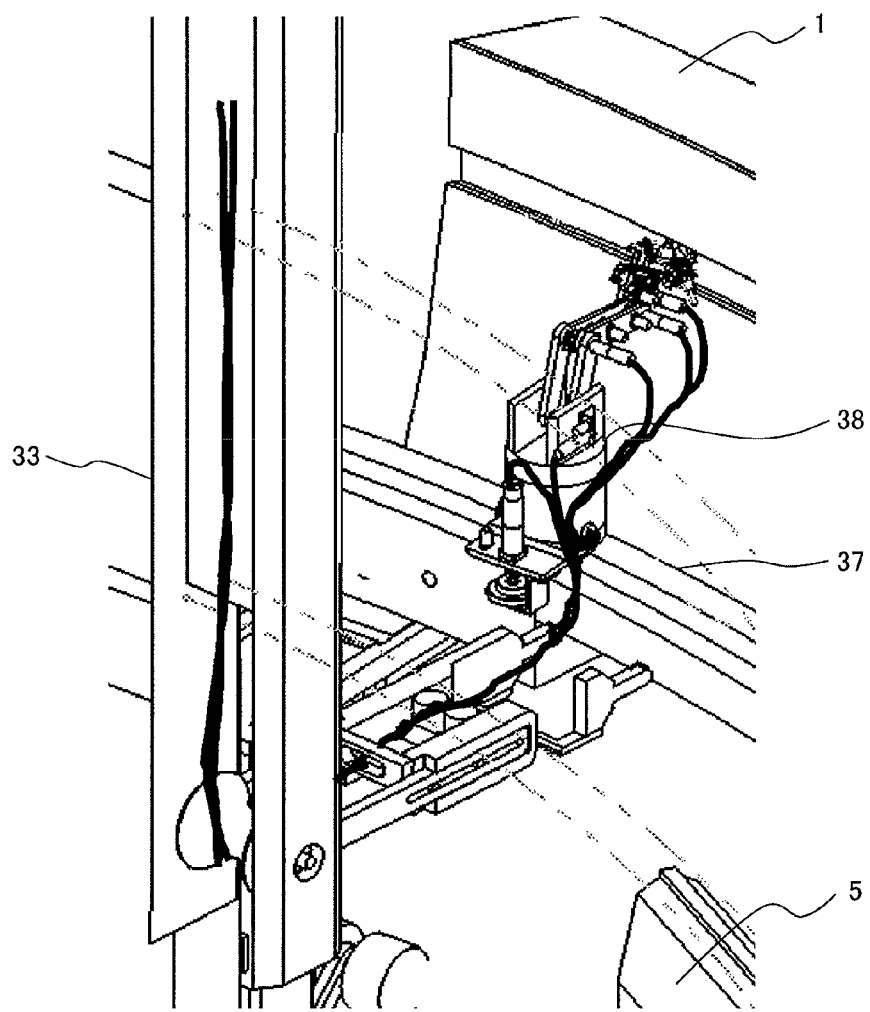
FIG. 31 is a partial perspective view showing an inside of a lower portion of a reactor pressure vessel in a state that a repair device is set on a rail after a state shown in FIG. 30.

Thereafter, as shown in FIG. 31, the repair device 38 is set in the medium rail 37.

The present embodiment can obtain the effects generated in embodiment 1.

[Embodiment 3]

A rail-type repair apparatus according to embodiment 3, which is further another preferred embodiment of a shroud support repair apparatus of the present invention, will be explained. The rail-type repair apparatus 78 (see FIG. 34) of the present embodiment is disposed directly above the shroud support plate 4 in the annular portion 40. The rail-type repair apparatus 78 is applied to the boiling water nuclear power plant.

Figure 32:
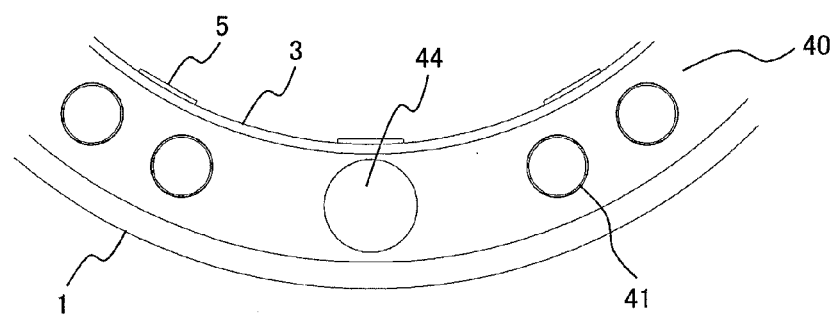
FIG. 32 is a plan view showing an annulus portion formed above a shroud support plate disposed in a reactor pressure vessel.

FIG. 32 is a plan view showing the annulus portion 40 formed above the shroud support plate 4 disposed in the reactor pressure vessel 1 and disposed. A plurality of jet pumps 41 are disposed in the annular portion 40.

As shown in FIG. 32, the annulus portion 40 is formed between the reactor pressure vessel 1 and each of the core shroud 6 and shroud support cylinder 3, and positions directly above the shroud support plate 4. The plurality of jet pumps 41 are installed on the shroud support plate 4.

Figure 33:
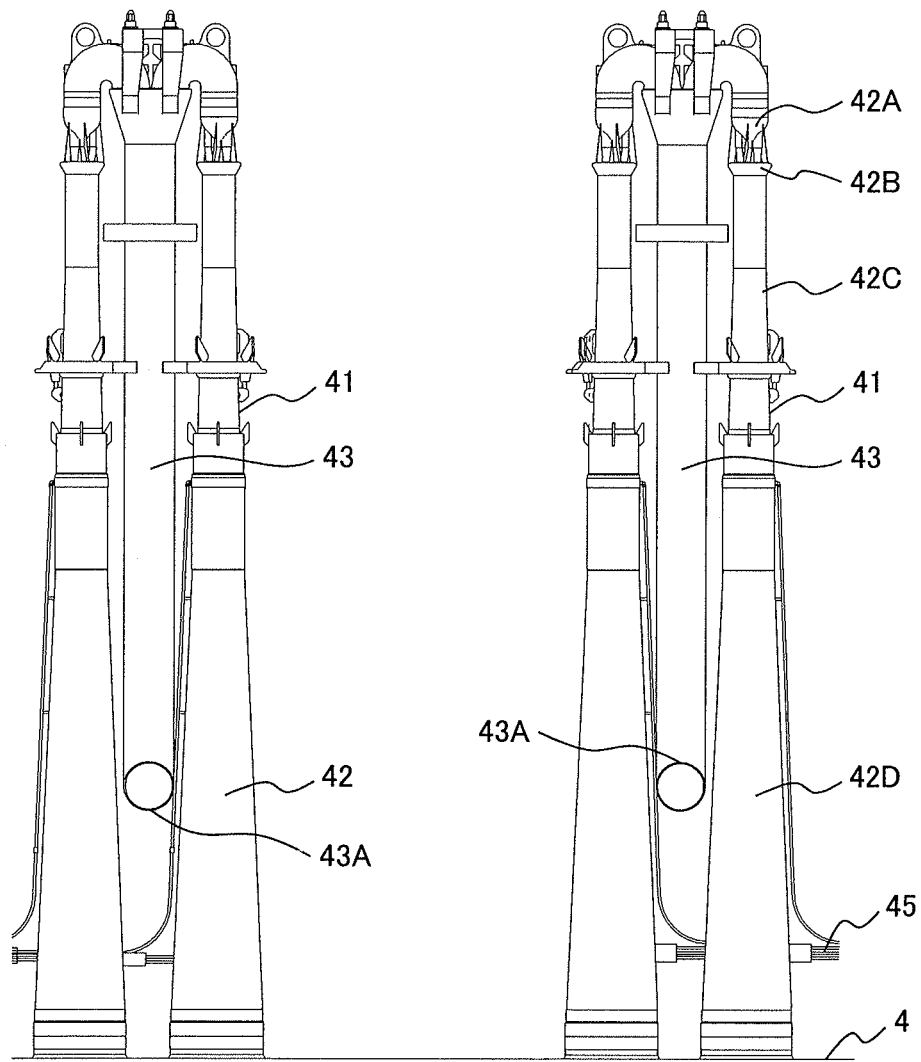
FIG. 33 is a side view showing jet pumps disposed in an annulus portion in which a rail-type repair apparatus according to embodiment 3, which is further another preferred embodiment of a shroud support repair apparatus of the present invention, is installed on each of the jet pumps.

The jet pump 41, as shown in FIG. 33, is provided with a nozzle 42A, a bell mouth 42B, a throat 42C and a diffuser 42D. The nozzle 42A is disposed directly above the bell mouth 42B and an upper end of the throat 42C is attached to the bell mouth 42B. The throat 42C and the diffuser 42D are connected with a slip joint. In the slip joint, a lower end portion of the throat 42C is inserted into an upper end portion of the diffuser 42D. A lower end of the diffuser 13 is joined with the shroud support plate 4. One riser pipe 43 disposed in the annular portion 40 is communicated with each nozzle 42A of two jet pumps 41. A lower end portion of the riser pipe 43 is connected to 90° elbow connected to a pipe 43A extending in the horizontal direction and penetrating the reactor pressure vessel 1. Further, instrumentation pipes 45 for each diffuser 42D of the two jet pumps 41 are connected to each side of the two diffusers 42D. Further, an instrumentation pipe 45 is connected to the side of each of the diffusers 42.

The jet pumps 41 structured like this are arranged almost symmetrically right and left for the 0° and 180° axes on a cross section of the reactor pressure vessel 1 and the gap is very narrow. However, an access hole 44 is formed in the shroud support plate 4 at the 0° and 180° positions, respectively and the space is comparatively opened at directly above each access hole 44.

Figure 34:
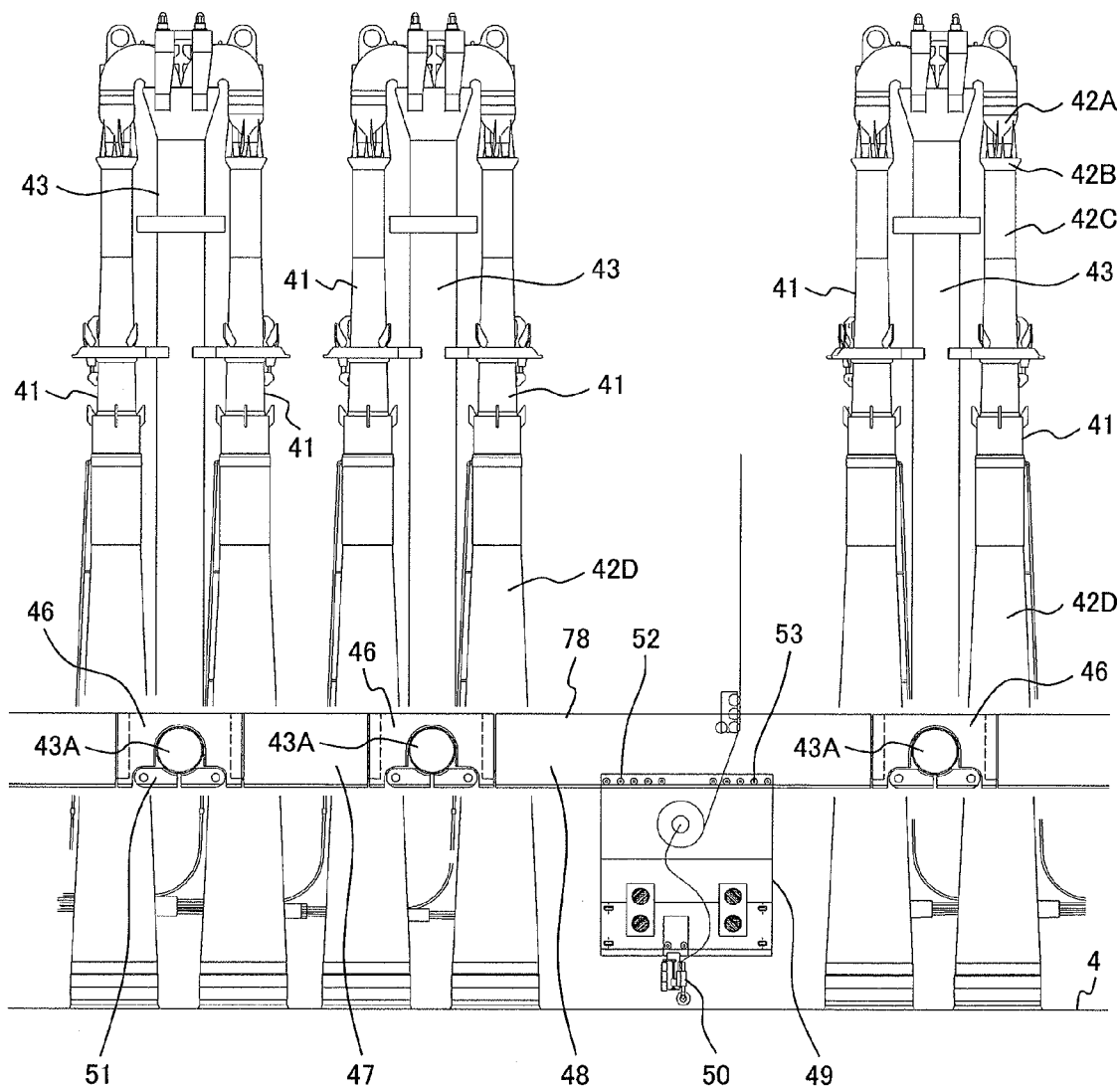
FIG. 34 is a side view showing a rail-type repair apparatus according to embodiment 3, which is further another preferred embodiment of a shroud support repair apparatus of the present invention, is installed.

The rail-type repair apparatus 78 disposed in the annulus portion will be explained by referring to FIG. 34.

As shown in the drawing, the rail-type repair apparatus 78 is provided with a plurality of support rails 46 attached to the riser pipe 43 (specifically speaking the pipe 43A), a plurality of connection rails 47 for coupling to the support rails 46 being adjacent to this connection rail 47, a plurality of long rails 48 positioned directly above the access hole, a travel apparatus 49 for moving on these rails 46, 47, and 48, and a repair device 50 mounted on the lower surface of the travel apparatus 49.

The support rail 46 has two pawls 51 for opening and closing. The support rail 46 is held on the riser pipe 43, and more specifically, the pipe 43A by closed pawls 51. Further, the connection rail 47 is inserted between the support rails 46 set to the pipes 43A from above and both end portions of the inserted connection rail 47 are coupled to the support rails 46 being adjacent to the inserted connection rail 47. A distance in directly above the access hole 44 and between the support rails 46 being adjacent to each other is longer than a distance between the support rails 46 being adjacent to each other except for the position existing directly above the access hole 44, so that a long rail 48 is used in the position existing directly above the access hole 44. The travel apparatus 49 moves on these rails with a front wheel 52 and a rear wheel 53, so that the front wheel 52 and the rear wheel 53 are configured by a plurality of wheels to respond to the gaps of the coupling portions of the rails. Further, the repair device 50 is mounted on the lower surface of the travel apparatus 49.

A setting procedure of the rail-type repair apparatus 78 of the present embodiment will be explained by referring to FIGS. 35 to 44.

Figure 35:
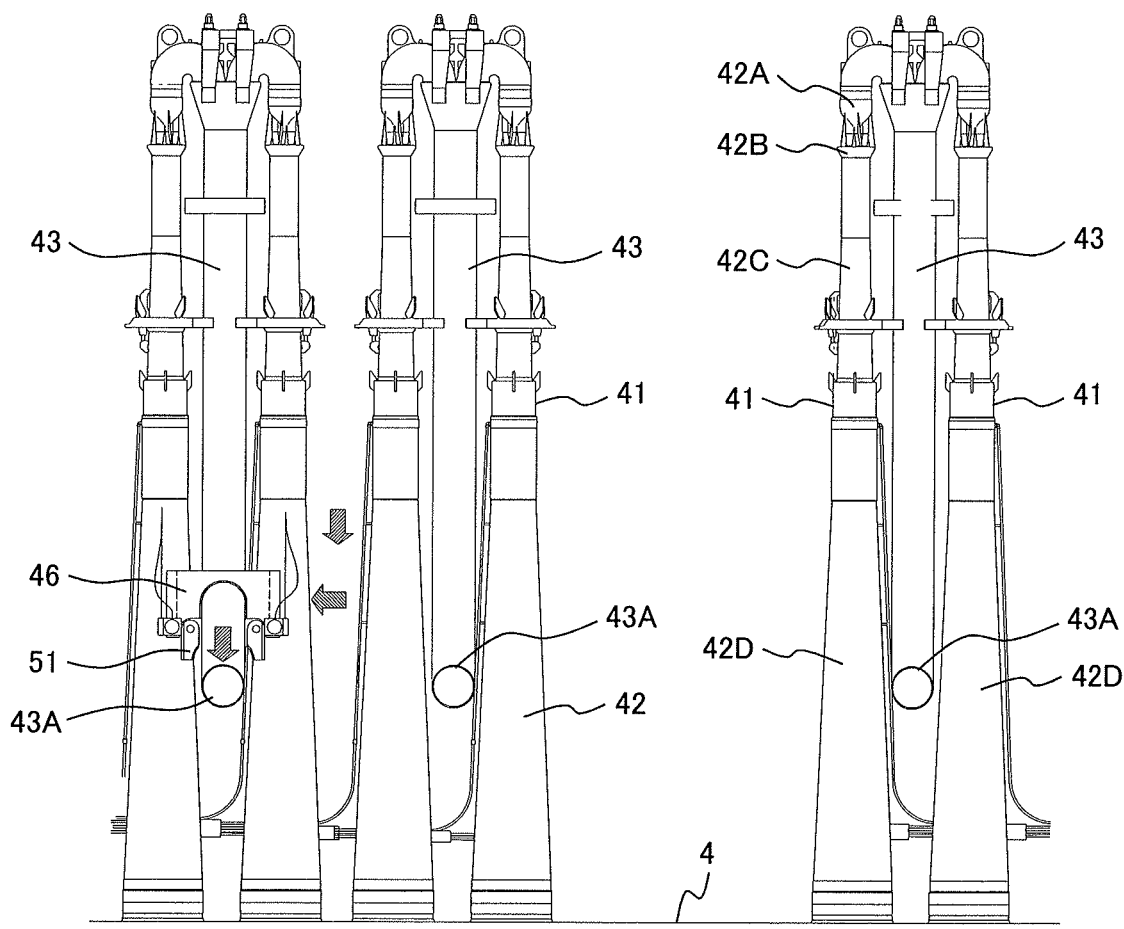
FIG. 35 is a side view showing a support rail in a state that the support rail is set on a riser pipe through which driving water is introduced into a jet pump disposed in an annulus portion formed between a core shroud and a reactor pressure vessel.
Figure 36:
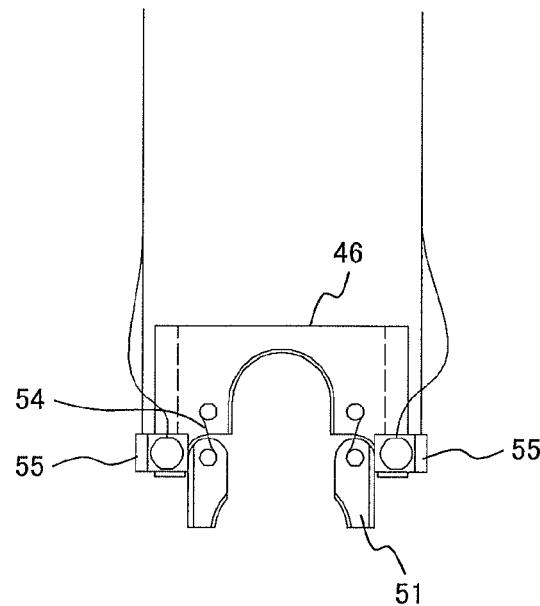
FIG. 36 is an explanatory drawing showing a state that a pair of pawls of a support rail shown in FIG. 35 is opened.
Figure 37:
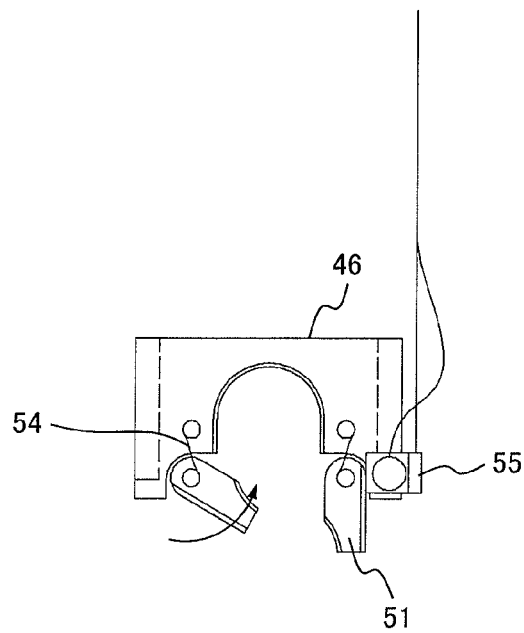
FIG. 37 is an explanatory drawing showing a state that a pair of pawls of a support rail shown in FIG. 35 moves.
Figure 38:
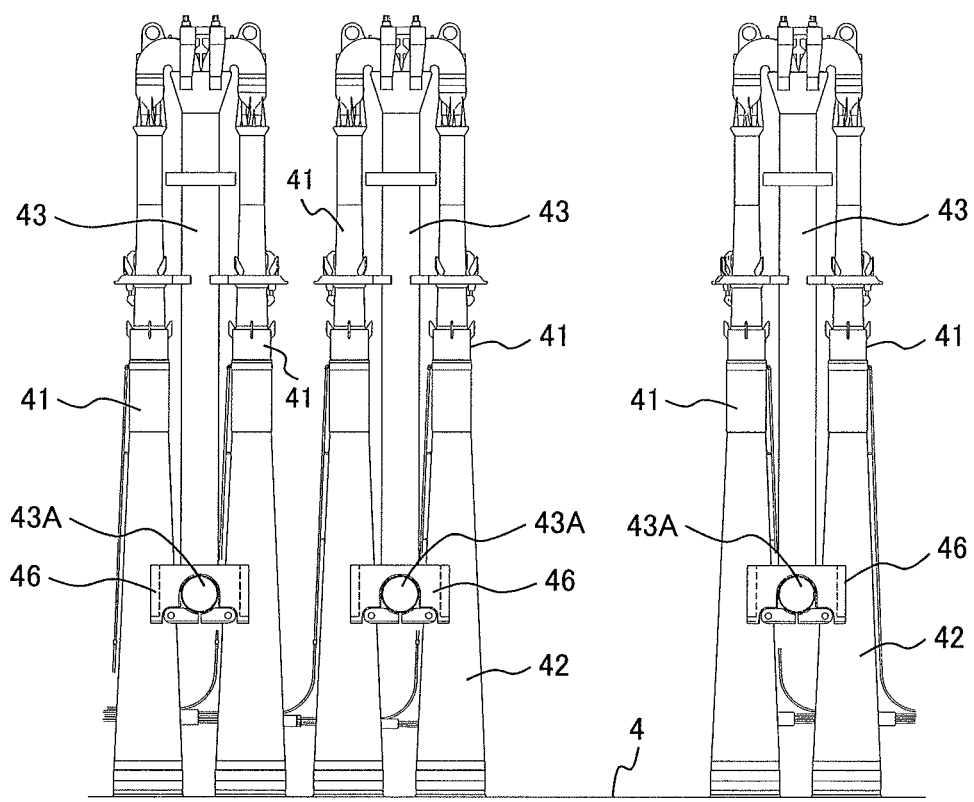
FIG. 38 is an explanatory drawing showing a state that all support rails were mounted to each riser pipe.

With respect to the setting of the rail-type repair apparatus 78, firstly, as shown in FIG. 35, the support rail 46 is hanged down through a gap between the jet pumps 41 in the state that both sides are held by a clamp jig 55 and is set on one riser pipe 43, that is, one pipe 43A. At this time, pawls 51 of the support rail 46 are opened, as shown in FIG. 36 and after the support rail 46 set on the one riser pipe 43, the pawls 51 are closed. The rotating shaft of each of the pawls 51 has a winding spring 54 and winding springs 54 always permit the spring force to act the pawls 51 in the closing direction, though the clamp jig 54 clamps each side of the pawls 51, so that the operation closing each of the pawls 51 is stopped. Thereafter, when the support rail 46 is set on the riser pipe 43, the clamp jig 55 is removed from the support rail 46, thus as shown in FIG. 37, the pawl 51 is closed to be fixed to the riser pipe 43. By the similar procedure, as shown in FIG. 38, the support rail 46 is set on the other riser pipe 43.

Figure 39:
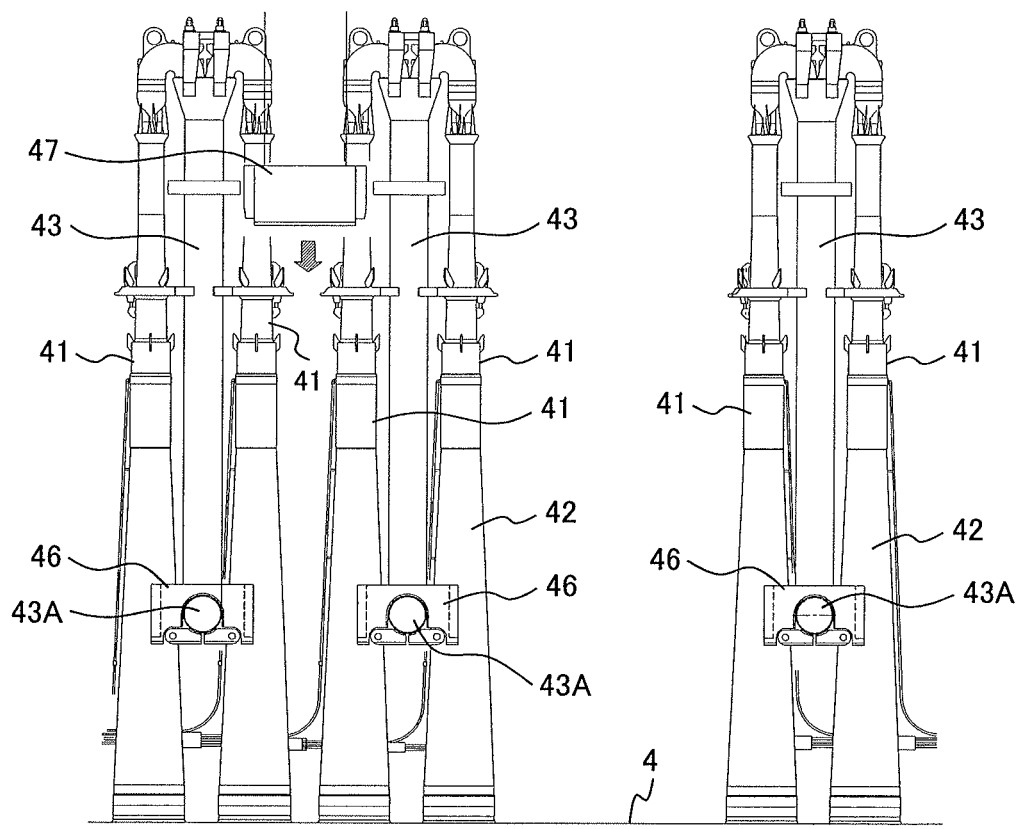
FIG. 39 is an explanatory drawing showing a state that a connection rail is hanged down in an annulus portion after a state shown in FIG. 38.

Next, the setting of the connection rails 47 will be explained. Both end portions of the connection rail 47 are convex, and both end portions of the support rail 46 is concave. As shown in FIG. 39, the connection rail 47 is hanged down from above to position of the support rail 46 set on the riser pipe 43. The hanged down connection rail 47 is inserted between the support rails 46 being adjacent to each other in a circumferential direction of the reactor pressure vessel 1. The convex surface of both end portion of the inserted connection rail 47 is fitted to the concave surface of each of the support rails 46 being adjacent to the inserted connection rail 47. Thus, Both end portion of the inserted connection rail 47 are coupled to two rails support rails 46 being adjacent to the inserted connection rail 47.

Figure 40:
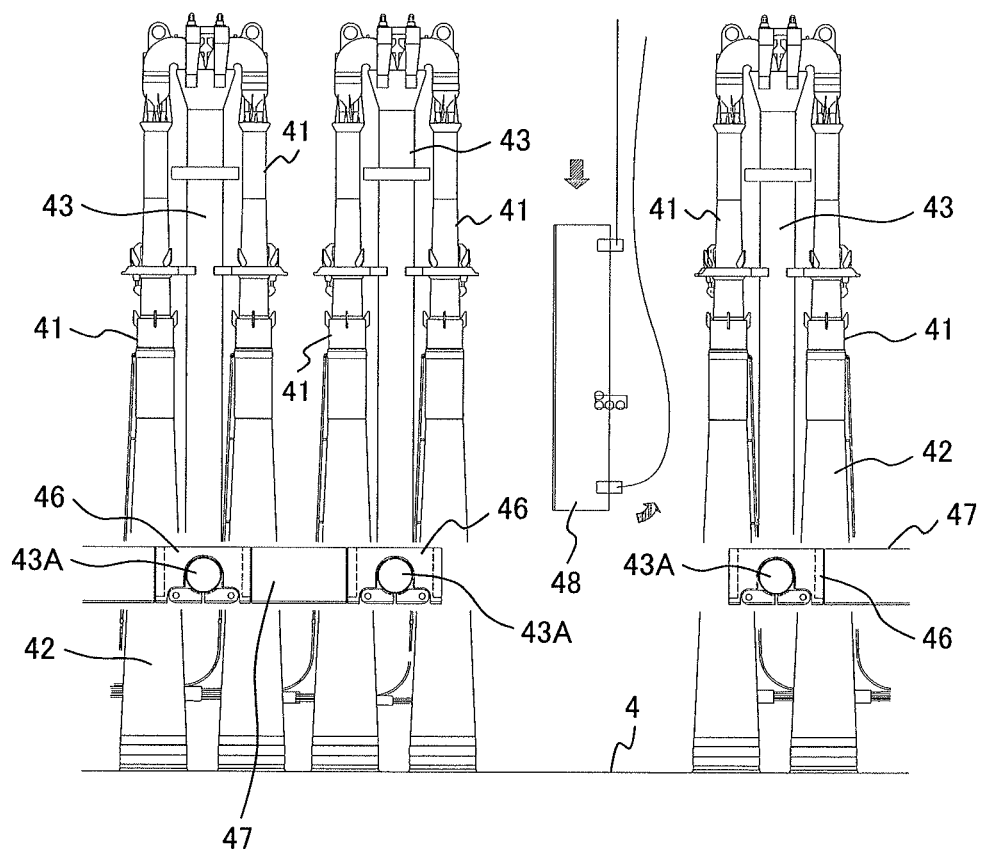
FIG. 40 is an explanatory drawing showing a state that a long rail is hanged down in an annulus portion after connection rails are disposed between support rails and connected to each of the support rails.
Figure 41:
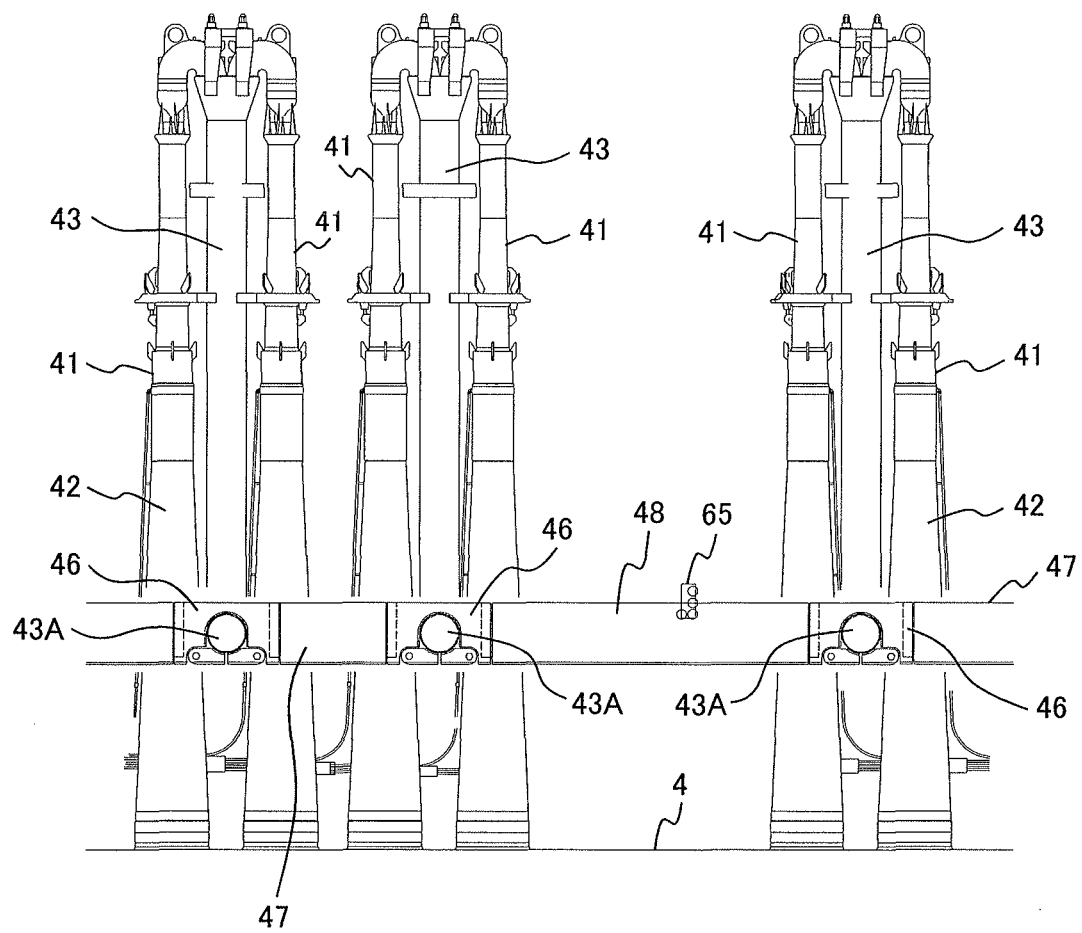
FIG. 41 is an explanatory drawing showing a state that a long rail is set to the support rails after a state shown in FIG. 40.

The long rail 48 is long, so that as shown in FIG. 40, it is firstly hanged down lengthwise, is thereafter pulled up sideways, and then is set on the adjoined support rail 46 at directly above the access hole 44, as with the connection rail 47. FIG. 41 shows the rail set state of the support rails 46, the connection rails 47, and the long rail 48.

Figure 42:
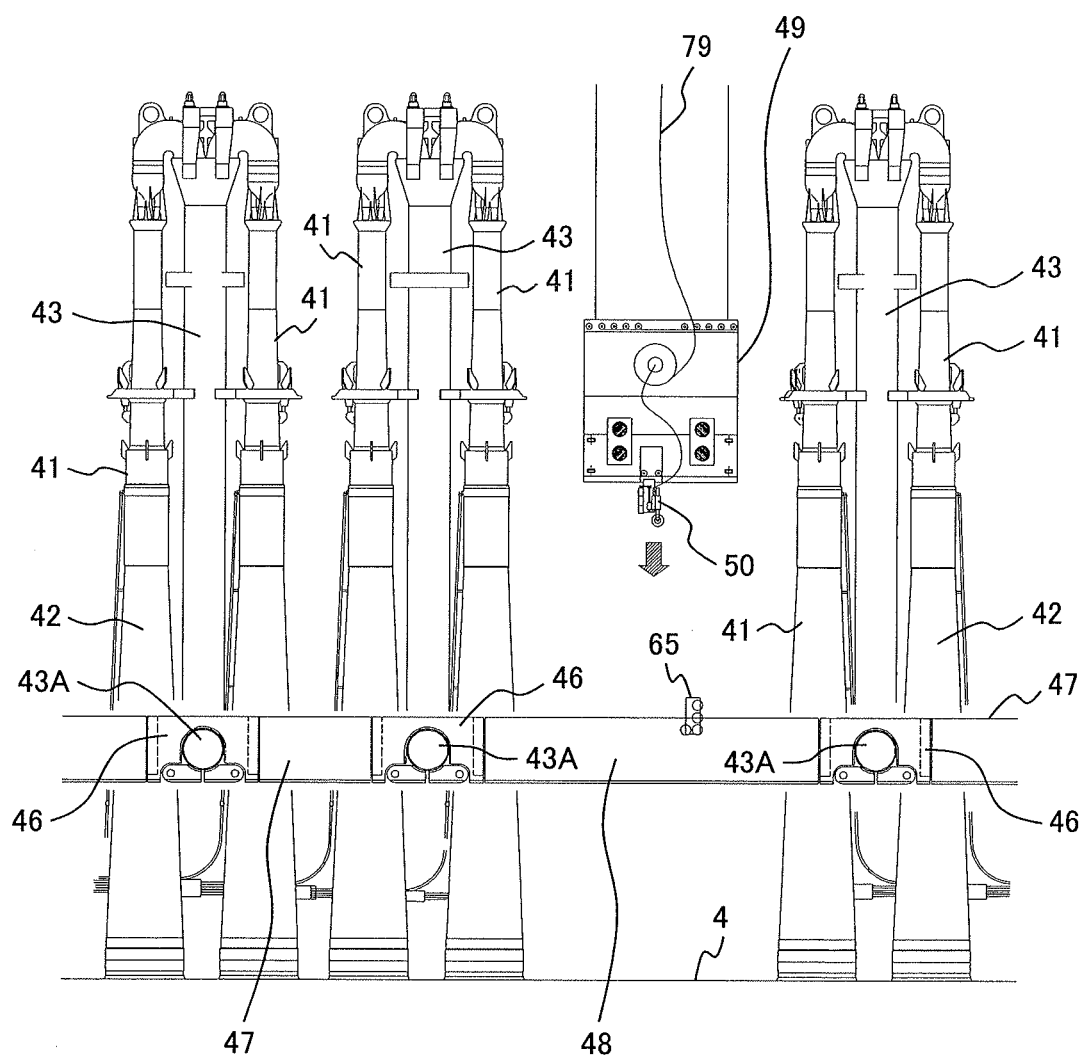
FIG. 42 is an explanatory drawing showing a state that a travel apparatus of a rail-type repair apparatus is set hanged down in an annulus portion after a state shown in FIG. 41.

In this state, the travel apparatus 49 and the repair device 50 are set. The repair device 50 is set in the state that it is fixed to the travel apparatus 49. The travel apparatus 49 is hanged down and set by using a place in which comparatively sufficient space exists, positioning directly above the access hole 44 at 0° or 180° of the reactor pressure vessel 1, as shown in FIG. 42.

Figure 43:
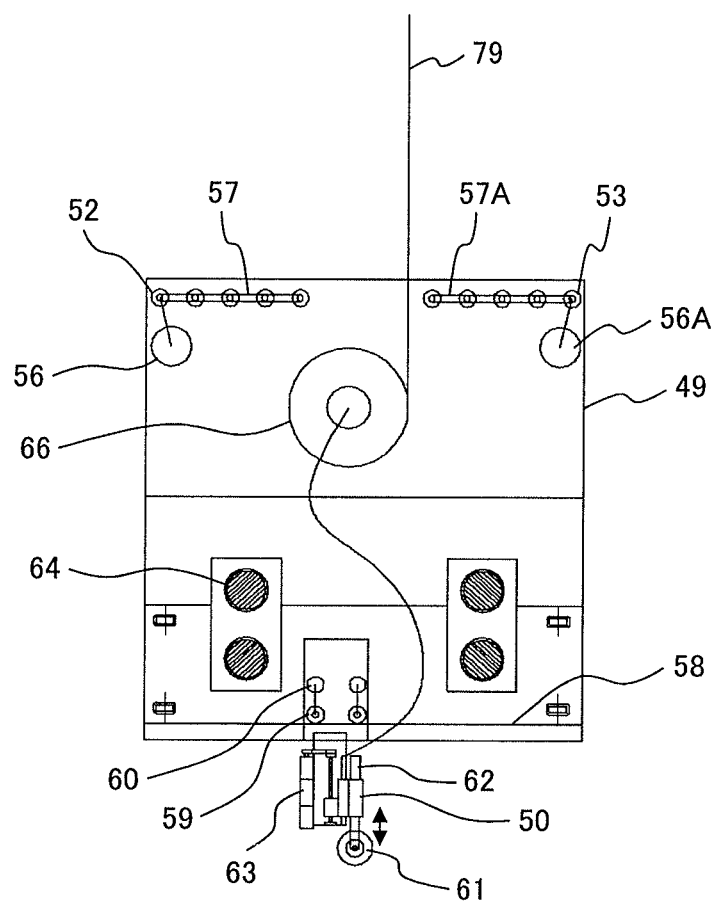
FIG. 43 is a side view showing a travel apparatus shown in FIG. 42.

FIG. 43 shows the constitution of the travel apparatus 49. As shown in the drawing, the travel apparatus 49 has the front wheel 52 and the rear wheel 53 configured by a plurality of wheels and moves by laying and attaching movably the front wheel 52 and the rear wheel 53 to the rail. The movement includes a forward movement and a backward movement in two directions, and the forward movement is performed by the front wheel 52, and the backward movement is performed by the rear wheel 53. One wheel included in the front wheel 52 is driven by a travel motor 56 and the other wheels included in the front wheel 52 are connected to the one wheel with a chain 57 and drive similarly. Furthermore, one wheel included in the rear wheel 53 is driven by a travel motor 56A and the other wheels included in the rear wheel 53 are connected to the one wheel with a chain 57A and drive similarly. The wheels can be connected by a belt or a gear.

The lower surface of the travel apparatus 49 has a rail 58 and the repair device 50 has a wheel 59 and a travel motor 60, so that it can move on the rail 58 of the travel apparatus 49. The grinding function will be indicated as an example for the repair device 50. A grindstone 61 is attached to a leading edge of the repair device 50 and operated by a grindstone rotation motor 62 mounted to the repair device 50. Further, the concerned portion is vertically driven to push in the grindstone 61 and is operated by a vertical drive motor 63 and the ball screw connected to it.

Figure 44:
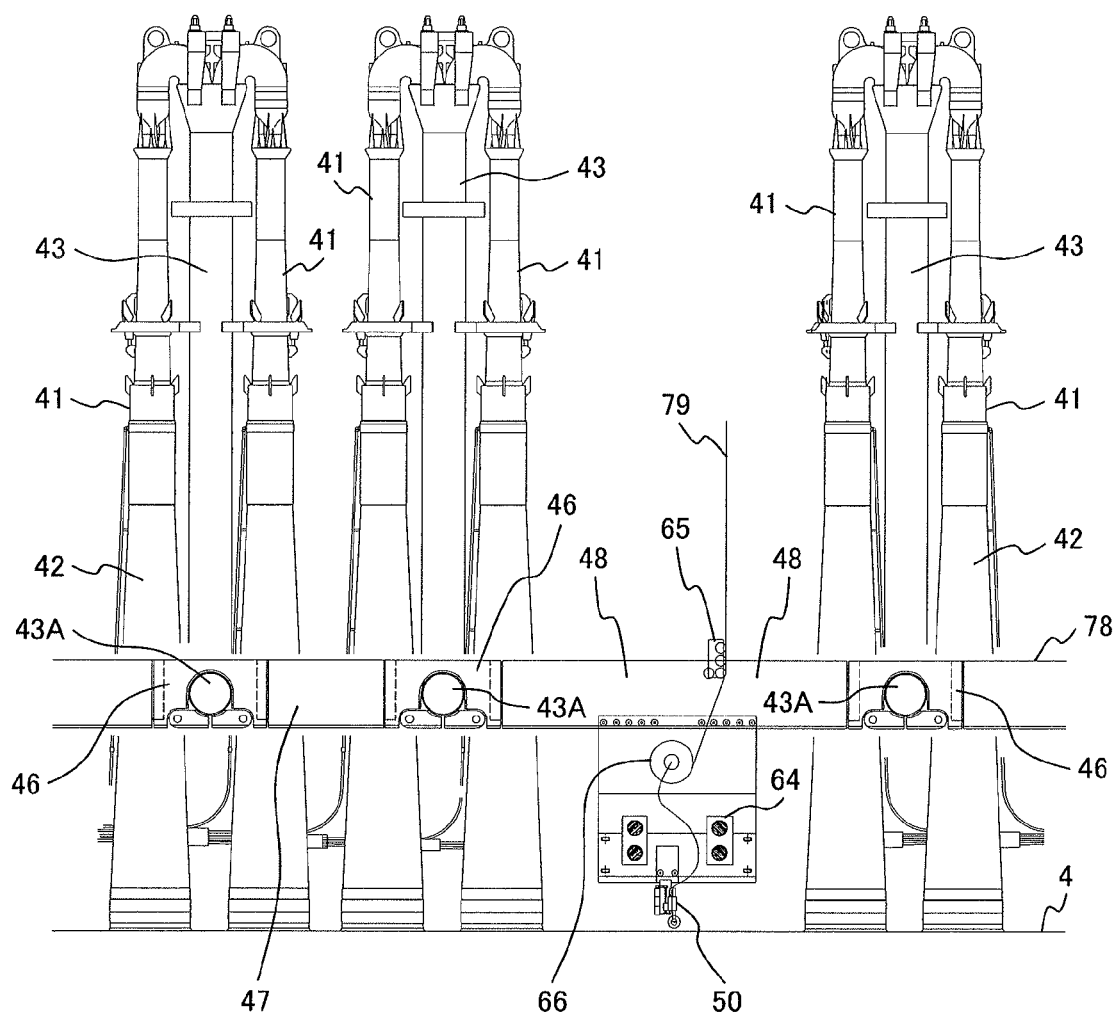
FIG. 44 is an explanatory drawing showing a state that a travel apparatus is movably mounted to a rail after a state shown in FIG. 42.

The travel apparatus 49 has a cable reel 66 for winding and fixing beforehand the cable hose length equivalent to the travel distance, and a guide pulley 65 and an adsorption pad 64 which are provided on the long rail 48 (see FIG. 44). The reason is that when the travel apparatus 49 moves within the range, for example, from the 0° direction to 90° of the reactor pressure vessel 1, the cable hose 79 inserted from the 0° position is received once by the guide pulley 65 and is guided in the 90° direction, and the cable hose 79 wound round the cable reel 66 provided in the travel apparatus 49 is extended, thus the cable hose length becoming deficient during movement is covered. Further, when repairing the forward portion of 90° or more, the travel apparatus 49 is inserted from the 180° position and moves counterclockwise, thus the troubleshooting is enabled by the minimum movement distance.

Even by use of such a constitution of the present embodiment, the present embodiment can obtain the effects generated in embodiments 1 and 2.

Figure 45:
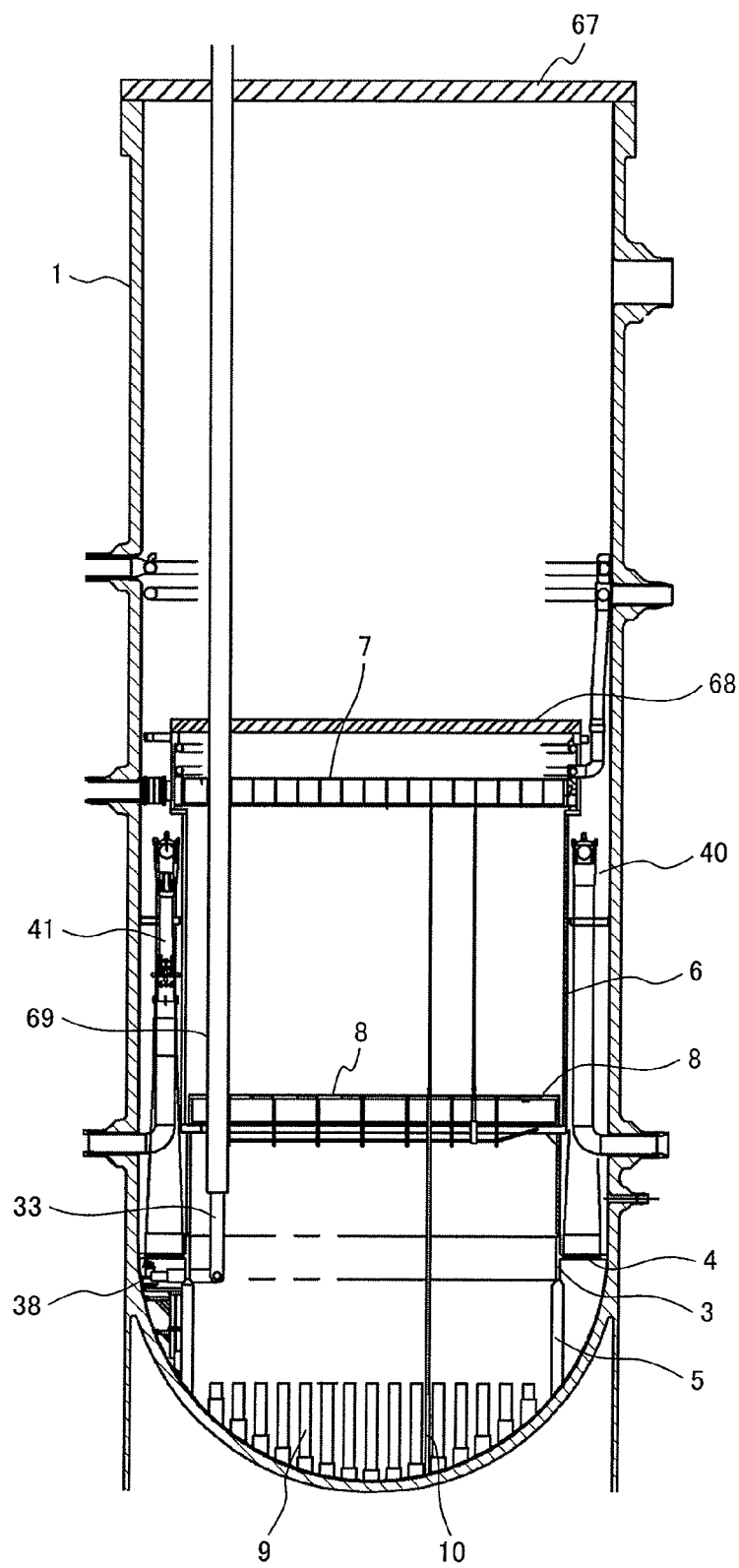
FIG. 45 is an explanatory drawing showing a state that a repair device of a shroud support repair apparatus disposed directly below a shroud support plate.

The rail setting procedure is explained above, however, when executing a weld repair among the repair operations, an aerial environment in the reactor pressure vessel 1 is desirable. Regarding the rail setting apparatus from the lower side of the shroud support plate 4 shown in FIGS. 1 and 15, the repair device setting in the aerial environment is shown in FIG. 45 using embodiment 2 as an example.

As shown in the drawing, when filling the reactor pressure vessel 1 with water, the settings of the rail 27 and the medium rail 37 are finished, and thereafter, a first shielding body 67 is installed on the flange portion of the reactor pressure vessel 1, and a second shielding body 68 is installed on the upper portion of the core shroud 6, and a guide pipe 69 passing through the first shielding body 67 and the second shielding body 68 is set. Thereafter, the removal of the water in the reactor pressure vessel 1 is performed using a drain pipe. After completion of the water removal, the aerial environment is formed in the reactor pressure vessel 1 and the repair device (for example, welding device) 38 is set on the medium rail 37 by the operation apparatus 33 transferred in the guide pipe 69 and the repair operation is performed.

Further, also in embodiment 1, as shown in FIGS. 10 and 11, beforehand, the setting excluding the rails 11 at one place where the repair device 12 is set in the underwater environment and the setting of the one place of the concerned rails 11 are executed up to the level equivalent to FIG. 9, and after the underwater environment is changed to the aerial environment, the guide pipe 69 is permitted to pass through the one place of the concerned rails 11, and the repair device 12 is passed through the guide pipe 69 and installed on the rails 11, and the rail push-out apparatus 17 that is similarly passed through the guide pipe 69 is installed on the support apparatus 14, and then the socket ball 26 with motor is hanged down by remote control, and the rails 11 are pushed out, and the repair device 12 is installed, thus the repair operation is executed.

Further, in each embodiment aforementioned, the welding apparatus is explained as an example of a repair device, however, it is needless to say that the repair operation can be executed using various processing apparatuses or an inspection apparatus in place of the welding apparatus.

Further, in each embodiment, the rails installed in the reactor pressure vessel are laid at 360° in the overall perimeter of the reactor pressure vessel, however, there is no need to lay rails in the overall perimeter of the reactor pressure vessel. If the weld is inspected beforehand by an ultrasonic inspection apparatus and the place where cracks exist is confirmed, rails may be laid over the repair range of the place of the weld where cracks exist.

[Reference Signs List]

1: reactor pressure vessel, 2: shroud support, 3: shroud support cylinder, 4: shroud support plate, 5: shroud support leg, 6: core shroud, 7: upper grid plat, 8: core support plate, 9: control rod drive mechanism housing, 10: incore monitor housing, 11, 27, 58: rail, 12, 38, 50: repair device, 13: support base, 14: support apparatus, 15: rail guide member, 16a, 16b: support arm, 17: rail push-out apparatus, 18a, 18b, 20: pin, 19: beam, 21: pulley, 22, 34: bolt, 23: ball screw, 24: table, 25, 57, 57A: chain, 26: socket ball, 28: rail support apparatus, 29: upper portion support apparatus, 30: lower portion support apparatus, 31: upper support arm, 32: lower support arm, 40: annulus portion, 41: jet pump, 42A: nozzle, 42C: throat, 42D: diffuser, 43: riser pipe, 44: access hole, 45: instrumentation pipe, 46: support rail, 47: connection rail, 48: long rail, 49: travel apparatus, 51: pawl, 52: front wheel, 53: rear wheel, 54: winding spring, 55: clamp jig, 56, 56A, 60: travel motor, 59: wheel, 61: grindstone, 62: grindstone rotation motor, 63: vertical drive motor, 64: adsorption pad, 65: guide pulley, 66: cable reel, 67: first shielding body, 68: second shielding body, 69: guide pipe, 70: arm development repair apparatus, 71: opening portion, 74: pile-up repair apparatus, 78: rail-type repair apparatus.

What is claimed is:

1. A method of repairing a shroud support, comprising the steps of:

setting each of support apparatuses on each upper end of a plurality of control rod drive mechanism housings attached to a bottom of a reactor pressure vessel, in said reactor pressure vessel;

positioning horizontally a rail guide member rotatably attached to each of said support apparatus by rotating said rail guide member in an axial direction of said reactor pressure vessel;

setting a rail on each of said rail guide members;

moving each of said rails, which include said rail on which said repair device is set and said rail on which said repair device is not set, toward an inner surface of said reactor pressure vessel along each said rail guide member, said rails setting on each of said rail guide members;

setting a plurality of said moved rails along a weld of said shroud support in a reactor pressure vessel over either an entire perimeter on an inner circumference of said reactor pressure vessel or a part of said entire perimeter; and performing repair operation of said weld of said shroud support by a repair device that is moved along said plurality of rails set along said weld of said shroud support.

2. The method of repairing a shroud support according to claim 1, wherein said setting of said rails comprises the steps of:

setting a support base on each upper end of said part of said plurality of control rod drive mechanism housings;

performing said set of said support apparatus by setting said support apparatus on said support base; setting a rail push-out apparatus on each of said support apparatuses; and performing the movement of each of said rails by pushing out each of said rails by each of said set rail push-out apparatuses, said repair device being set on said rail positioning below said weld of said shroud support.

3. The method of repairing a shroud support according to claim 1, wherein said repair operation is performed under an air atmosphere.

4. The method of repairing a shroud support according to claim 1 further comprising the steps of:

attaching support arms to each of support apparatuses;

performing said set of each of said rails by setting a bent rail on each of said rail guide members;

performing said movement of each of said rails by moving each of said bent rails, which include said bent rail on which said repair device is set and said bent rail on which said repair device is not set, toward an inner surface of said reactor pressure vessel along each said rail guide member;

spreading each of said bent rails; and supporting each of said spread rails by said support arms attached to each of said support apparatuses.

5. The method of repairing a shroud support according to claim 4, wherein said setting of said rails comprises the steps of:

setting a rail push-out apparatus on each of said support apparatuses;

performing the movement of each of said rails by pushing out each of said rails by each of said set rail push-out apparatuses, said repair device being set on said rail positioning below said weld of said shroud support; and performing said spreading of said bent rail by an upward curvature formed on top of each of said support arms when said bent rail is moved by said rail push-out apparatus.

* * * * *